United States Patent
Zhang et al.

(10) Patent No.: US 12,542,618 B2
(45) Date of Patent: Feb. 3, 2026

(54) EVENT-TRIGGERED LAYER 1 OR LAYER 2 CROSS LINK INTERFERENCE REPORTING

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/318,609

(22) Filed: May 16, 2023

(65) Prior Publication Data
US 2024/0388370 A1    Nov. 21, 2024

(51) Int. Cl.
*H04B 17/345* (2015.01)
*H04W 24/10* (2009.01)

(52) U.S. Cl.
CPC .......... *H04B 17/345* (2015.01); *H04W 24/10* (2013.01)

(58) Field of Classification Search
None
See application file for complete search history.

(56) References Cited

U.S. PATENT DOCUMENTS

| | | | |
|---|---|---|---|
| 2020/0107383 A1* | 4/2020 | Novlan | H04W 76/15 |
| 2021/0250797 A1* | 8/2021 | Karjalainen | H04W 24/10 |
| 2022/0386156 A1* | 12/2022 | Park | H04W 24/10 |
| 2023/0055304 A1* | 2/2023 | Shim | H04W 72/541 |
| 2024/0146425 A1* | 5/2024 | Fakoorian | H04W 76/20 |

* cited by examiner

*Primary Examiner* — Clemence S Han
(74) *Attorney, Agent, or Firm* — Kevin M. Donnelly; Harrity & Harrity, LLP

(57) ABSTRACT

Various aspects of the present disclosure generally relate to wireless communication. Some aspects more specifically relate to event-triggered layer 1 (L1) or layer (L2) cross link interference (CLI) reporting. In some aspects, a user equipment (UE) may perform a UE-to-UE CLI measurement. The UE may transmit an L1 CLI report in connection with a condition associated with an L1 trigger event being satisfied, or the UE may transmit an L2 CLI report in connection with a condition associated with an L2 trigger event being satisfied.

30 Claims, 19 Drawing Sheets

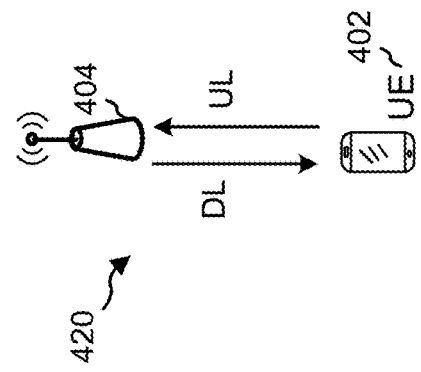
FIGURE 4B
FIGURE 4C
FIGURE 4A

EVENT-TRIGGERED LAYER 1 OR LAYER 2 CROSS LINK INTERFERENCE REPORTING

FIELD OF THE DISCLOSURE

Aspects of the present disclosure generally relate to wireless communication and, specifically, to techniques and apparatuses for event-triggered layer 1 or layer 2 cross link interference reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A wireless communication system may support full-duplex (FD) communication or dynamic time division duplex (TDD) communication. FD communication refers to simultaneous bi-directional communication between devices in a wireless network. For example, a network node operating in an FD mode may transmit a downlink communication and receive an uplink communication at the same time (for example, in the same slot or the same symbol). Dynamic TDD communication enables flexible allocation of downlink and uplink resources according to traffic conditions. In some examples, FD communication and dynamic TDD communication may reduce traffic latency, increase network resource utilization, and enhance spectral efficiency in a wireless network. However, cross link interference (CLI) may be prevalent in FD communication and dynamic TDD communication. For example, in dynamic TDD communication and FD communication, inter-cell UE-to-UE CLI may occur when a UE is transmitting an uplink communication in a cell and another UE is receiving a downlink communication at the same time in a neighboring cell. Additionally, in FD communication, intra-cell UE-to-UE CLI may occur when a UE in a cell is transmitting an uplink communication at the same time as another UE in the cell is receiving a downlink communication. Such CLI decreases the performance and reliability of FD communication and dynamic TDD communication.

SUMMARY

Some aspects described herein relate to a user equipment (UE) for wireless communication. The UE may include one or more memories storing processor readable code and one or more processors coupled with the one or more memories. The one or more processors may be individually or collectively operable to cause the user equipment to perform a UE-to-UE cross link interference (CLI) measurement. The one or more processors may be individually or collectively operable to cause the user equipment to transmit a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

Some aspects described herein relate to a network node for wireless communication. The network node may include one or more memories storing processor readable code and one or more processors coupled with the one or more memories. The one or more processors may be individually or collectively operable to cause the network node to transmit, to a UE, an indication of a CLI resource associated with a UE-to-UE CLI measurement to be performed by the UE. The one or more processors may be individually or collectively operable to cause the network node to receive, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to a UE for wireless communication. The UE may include one or more memories storing processor readable code and one or more processors coupled with the one or more memories. The one or more processors may be individually or collectively operable to cause the UE to perform a UE-to-UE CLI measurement. The one or more processors may be individually or collectively operable to cause the UE to transmit a CLI report indicating the UE-to-UE CLI measurement and assistance information associated with the UE-to-UE CLI measurement.

Some aspects described herein relate to a network node for wireless communication. The network node may include one or more memories storing processor readable code and one or more processors coupled with the one or more memories. The one or more processors may be individually or collectively operable to cause the network node to transmit, to a UE, an indication of a CLI resource associated with a UE-to-UE CLI measurement to be performed by the UE. The one or more processors may be individually or collectively operable to cause the network node to receive, from the UE, a CLI report indicating the UE-to-UE CLI measurement and assistance information associated with the UE-to-UE CLI measurement.

Some aspects described herein relate to a method of wireless communication performed by a UE. The method may include performing a UE-to-UE CLI measurement. The method may include transmitting an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to a method of wireless communication performed by a network node. The method may include transmitting, to a UE, an indication of a CLI resource associated with a UE-to-UE CLI measurement to be performed by the UE. The method may include receiving, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to a method of wireless communication performed by a UE. The method may include performing a UE-to-UE CLI measurement. The method may include transmitting a CLI report indicating the UE-to-UE CLI measurement and assistance information associated with the UE-to-UE CLI measurement.

Some aspects described herein relate to a method of wireless communication performed by a network node. The method may include transmitting, to a UE, an indication of a CLI resource associated with a UE-to-UE CLI measurement to be performed by the UE. The method may include receiving, from the UE, a CLI report indicating the UE-to-UE CLI measurement and assistance information associated with the UE-to-UE CLI measurement.

Some aspects described herein relate to a non-transitory computer-readable medium that stores a set of instructions for wireless communication by a UE. The set of instructions, when executed by one or more processors of the UE, may cause the UE to perform a UE-to-UE CLI measurement. The set of instructions, when executed by one or more processors of the UE, may cause the UE to transmit an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to a non-transitory computer-readable medium that stores a set of instructions for wireless communication by a network node. The set of instructions, when executed by one or more processors of the network node, may cause the network node to transmit, to a UE, an indication of a CLI resource associated with a UE-to-UE CLI measurement to be performed by the UE. The set of instructions, when executed by one or more processors of the network node, may cause the network node to receive, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to a non-transitory computer-readable medium that stores a set of instructions for wireless communication by a UE. The set of instructions, when executed by one or more processors of the UE, may cause the UE to perform a UE-to-UE CLI measurement. The set of instructions, when executed by one or more processors of the UE, may cause the UE to transmit a CLI report indicating the UE-to-UE CLI measurement and assistance information associated with the UE-to-UE CLI measurement.

Some aspects described herein relate to a non-transitory computer-readable medium that stores a set of instructions for wireless communication by a network node. The set of instructions, when executed by one or more processors of the network node, may cause the network node to transmit, to a UE, an indication of a CLI resource associated with a UE-to-UE CLI measurement to be performed by the UE. The set of instructions, when executed by one or more processors of the network node, may cause the network node to receive, from the UE, a CLI report indicating the UE-to-UE CLI measurement and assistance information associated with the UE-to-UE CLI measurement.

Some aspects described herein relate to an apparatus for wireless communication. The apparatus may include means for performing a UE-to-UE CLI measurement. The apparatus may include means for transmitting an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to an apparatus for wireless communication. The apparatus may include means for transmitting, to a UE, an indication of a CLI resource associated with a UE-to-UE CLI measurement to be performed by the UE. The apparatus may include means for receiving, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

Some aspects described herein relate to an apparatus for wireless communication. The apparatus may include means for performing a UE-to-UE CLI measurement. The apparatus may include means for transmitting a CLI report indicating the UE-to-UE CLI measurement and assistance information associated with the UE-to-UE CLI measurement.

Some aspects described herein relate to an apparatus for wireless communication. The apparatus may include means for transmitting, to a UE, an indication of a CLI resource associated with a UE-to-UE CLI measurement to be performed by the UE. The apparatus may include means for receiving, from the UE, a CLI report indicating the UE-to-UE CLI measurement and assistance information associated with the UE-to-UE CLI measurement.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of full duplex (FD) communication in accordance with the present disclosure.

DETAILED DESCRIPTION

Figure 1:
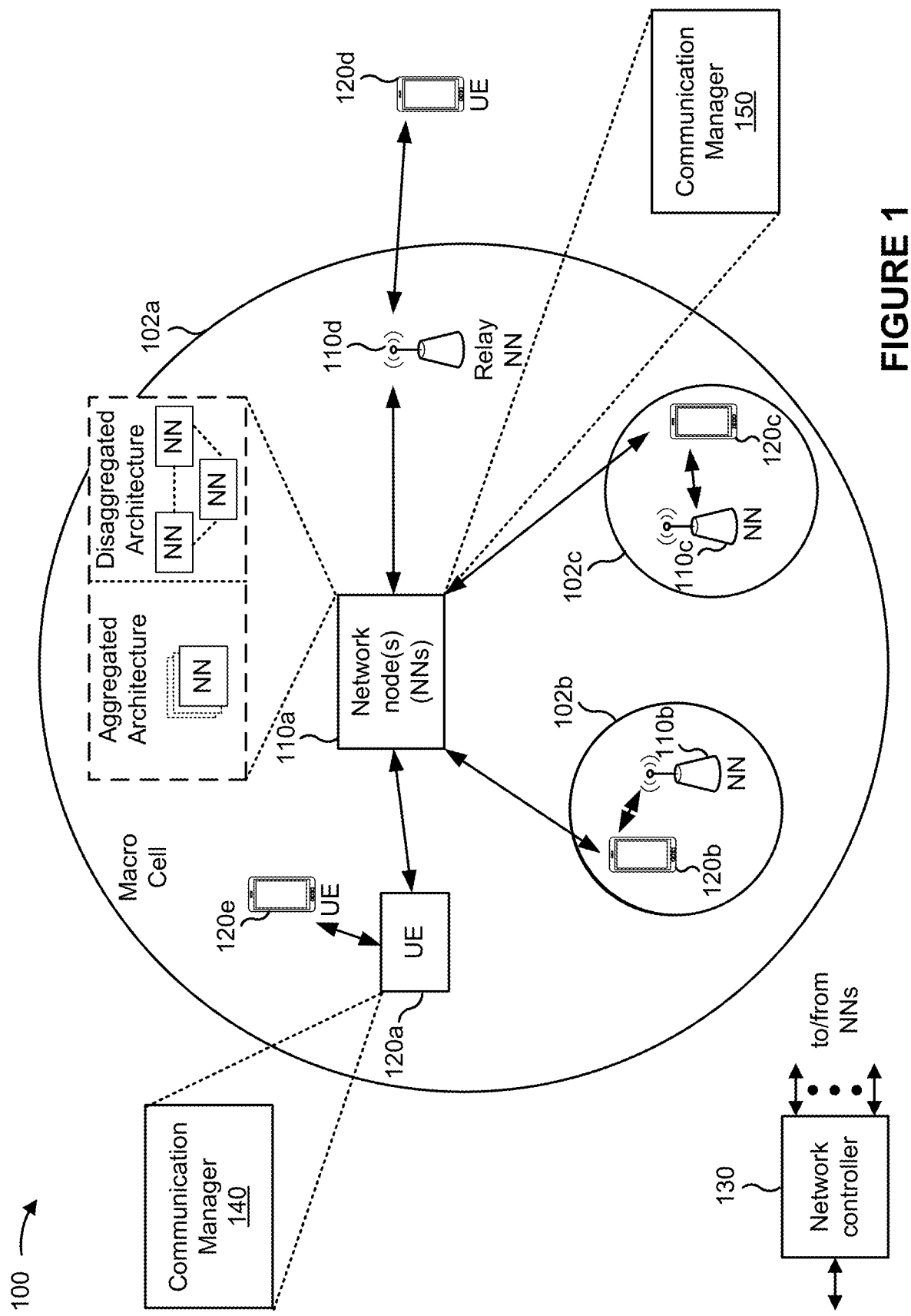
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to event-triggered layer 1 (L1) or layer (L2) cross link interference (CLI) reporting. Some aspects more specifically relate to triggering transmission, by a user equipment (UE), of an L1 CLI report in connection with a condition associated with an L1 trigger event being satisfied, or triggering transmission, by the UE, of an L2 CLI report in connection with a condition associated with an L2 trigger event being satisfied. In some aspects, the UE may perform a UE-to-UE CLI measurement on a CLI resource configured for the UE, and the condition associated with the L1 trigger event and/or the condition associated with the L2 trigger event may be based on or otherwise associated with the UE-to-UE CLI measurement. The UE may detect that the condition associated with the L1 trigger event is satisfied in connection with a determination that the CLI measurement satisfies a CLI threshold associated with the L1 trigger event. The UE may detect that the condition associated with the L2 trigger event is satisfied in connection with a determination that the CLI measurement satisfies a CLI threshold associated with the L2 trigger event. For example, the CLI threshold may be a CLI reference signal received power (RSRP) threshold that is compared with a CLI RSRP measurement, a CLI received signal strength indicator (RSSI) threshold that is compared with a CLI RSSI measurement, or a CLI signal-to-interference plus noise (SINR) threshold that is compared with a CLI SINR measurement.

In some examples, the UE may transmit the L1 CLI report to a network node in one or more uplink resources reserved for L1 CLI reporting in connection with the L1 trigger event. In some such examples, the UE may transmit the Li CLI report to the network node in a scheduling request (SR). In some such examples, the UE may transmit an SR to the network node, receive an uplink grant from the network node in connection with the SR, and transmit the L1 CLI report in one more granted uplink resources indicated in the uplink grant. In some other examples, the UE may transmit the L1 CLI report via a physical random access channel (PRACH) communication in a random access channel (RACH) resource. The RACH resource may be a RACH occasion (RO) associated with contention free random access (CFRA). In some examples, the L1 CLI report may include at least one of an indication that the condition associated with the L1 trigger event is satisfied or an indication of one or more CLI metrics associated with the UE-to-UE CLI measurement.

In some examples, the UE may transmit the L2 CLI report to the network node in an uplink medium access control (MAC) control element (MAC-CE) that is associated with L2 CLI reporting in connection with the L2 trigger event. In some such examples, the UE may transmit, to the network node, multiple uplink MAC-CEs in connection with the condition associated with the L2 trigger event being satisfied, and each of the multiple uplink MAC-CEs may include a respective L2 CLI report associated with a respective UE-to-UE CLI measurement performed by the UE.

In some examples, the UE may perform the UE-to-UE CLI measurement on a CLI resource in a downlink sub-band of a sub-band full duplex (SBFD) slot or symbol, an uplink sub-band of an SBFD slot or symbol, a downlink dynamic time division duplex (TDD) symbol, a partial overlapping in-band full duplex (IBFD) slot or symbol, or a fully overlapping IBFD slot or symbol. In some examples, the UE may transmit, to the network node, a CLI report, such as the L1 CLI report or the L2 CLI report, that includes assistance information relating to the UE-to-UE CLI measurement. For example, the assistance information my indicate at least one of a delta timing associated with the UE-to-UE CLI measurement or a power backoff for an aggressor UE associated with the UE-to-UE CLI measurement.

Particular aspects of the subject matter described in this disclosure can be implemented to realize one or more of the following potential advantages. In some examples, the described techniques can be used to deliver timely information relating to a UE-to-UE CLI measurement to a network node. In some examples, the transmission of the L1 or L2 CLI report in connection with an Li or L2 trigger event may be faster than event-triggered L3 CLI reporting, which has a long latency. Thus, by enabling event-triggered L1 or L2 CLI reporting, the described techniques may result in increased signaling speed for CLI measurements that represent short-term CLI conditions, which may enable the network node to perform CLI mitigation in connection with the short-term CLI conditions. In some examples, by configuring event-triggered L1 or L2 CLI reporting associated with UE-to-UE CLI measurements in an FD slot or symbol (for example, an SBFD or IBFD slot or symbol) or a dynamic TDD slot or symbol, the described techniques may improve CLI mitigation based on or otherwise associated with the CLI measurements on the FD slot or symbol or the dynamic TDD slot or symbol, and thus, increase the performance and reliability of FD communication and dynamic TDD communication. In some examples, by triggering the Li or L2 CLI reporting in connection with a condition associated with the UE-to-UE CLI measurement, reporting overhead may be reduced by refraining from transmitting L1 or L2 CLI reports when the condition is not satisfied. In some examples, by including assistance information, such as a delta time and/or a power backoff for an aggressor UE, in the CLI report, the UE may provide the network node with additional information that can be used by the network node to perform CLI mitigation, thus improving an accuracy of the CLI mitigation performed by the network node.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may perform a UE-to-UE CLI measurement; and transmit an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively. Additionally or alternatively, as described in more detail elsewhere herein, the communication manager 140 may perform a UE-to-UE CLI measurement; and transmit a CLI report indicating the UE-to-UE CLI measurement and assistance information associated with the UE-to-UE CLI measurement. Additionally or alternatively, the communication manager 140 may perform one or more other operations described herein.

In some aspects, the network node 110 may include a communication manager 150. As described in more detail elsewhere herein, the communication manager 150 may transmit, to a UE, an indication of a CLI resource associated with a UE-to-UE CLI measurement to be performed by the UE; and receive, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively. Additionally or alternatively, as described in more detail elsewhere herein, the communication manager 150 may transmit, to a UE, an indication of a CLI resource associated with a UE-to-UE CLI measurement to be performed by the UE; and receive, from the UE, a CLI report indicating the UE-to-UE CLI measurement and assistance information associated with the UE-to-UE CLI measurement. Additionally or alternatively, the communication manager 150 may perform one or more other operations described herein.

Figure 2:
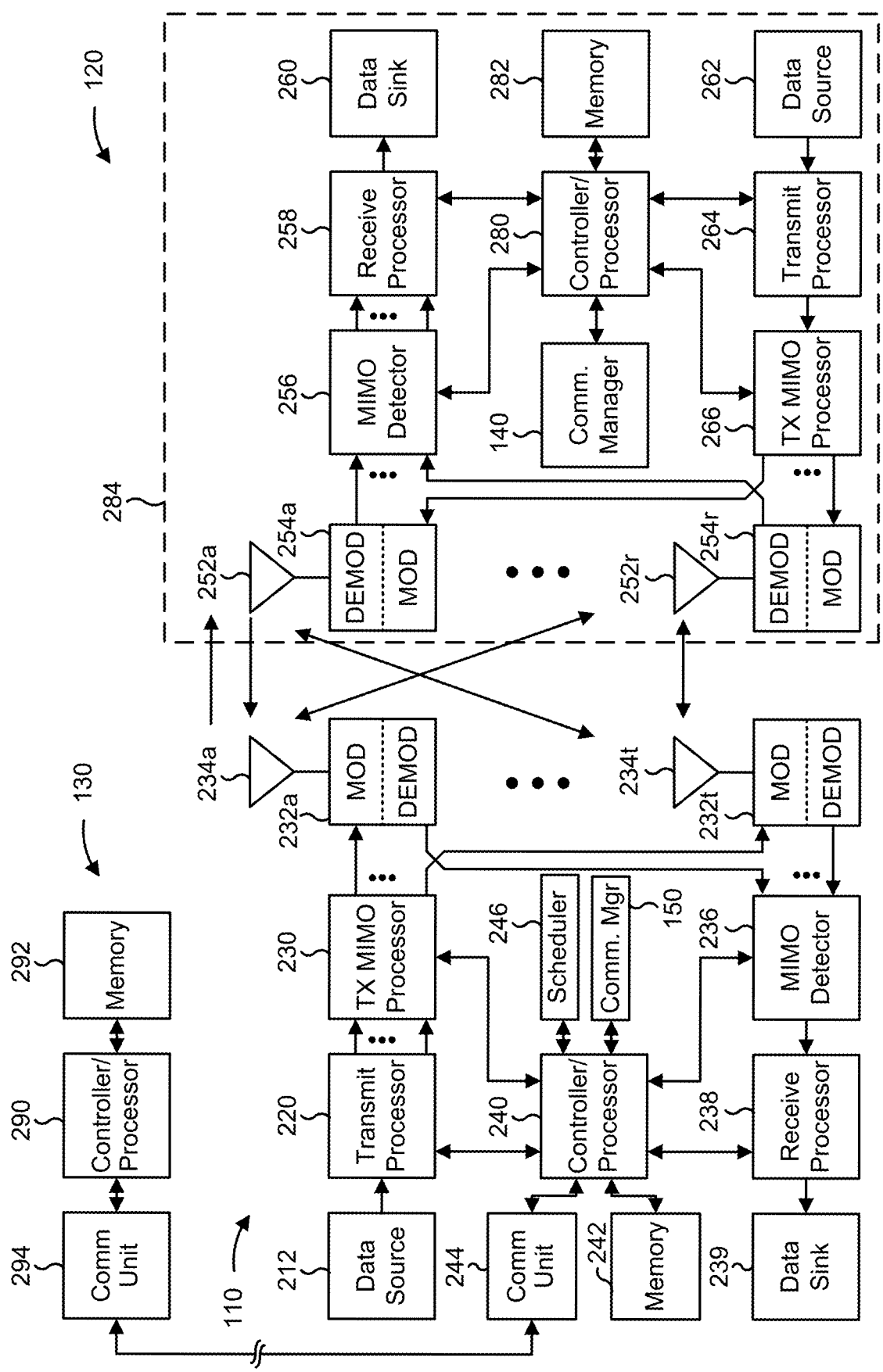
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine an RSRP parameter, an RSS parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with event-triggered L1 or L2 CLI reporting, as described in more detail elsewhere herein. For example, the controller/processor 240 of the network node 110, the controller/processor 280 of the UE 120, or any other component(s) of FIG. 2 may perform or direct operations of, for example, process 1100 of FIG. 11, process 1200 of FIG. 12, process 1300 of FIG. 13, process 1400 of FIG. 14, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1100 of FIG. 11, process 1200 of FIG. 12, process 1300 of FIG. 13, process 1400 of FIG. 14, or other processes as described herein. In some examples, executing instructions may include running the instructions, converting the instructions, compiling the instructions, or interpreting the instructions, among other examples.

In some aspects, a UE (for example, the UE 120) includes means for performing a UE-to-UE CLI measurement; and/or means for transmitting an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively. In some aspects, a UE (for example, the UE 120) includes means for performing a UE-to-UE CLI measurement; and/or means for transmitting a CLI report indicating the UE-to-UE CLI measurement and assistance information associated with the UE-to-UE CLI measurement. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (for example, the network node 110) includes means for transmitting, to a UE, an indication of a CLI resource associated with a UE-to-UE CLI measurement to be performed by the UE; and/or means for receiving, from the UE, an Li CLI report associated with the UE-to-UE CLI measurement or an L2 CLI report associated with the UE-to-UE CLI measurement in connection with a condition associated with an L1 trigger event or a condition associated with an L2 trigger event being satisfied, respectively. In some aspects, a network node (for example, the network node 110) includes means for transmitting, to a UE, an indication of a CLI resource associated with a UE-to-UE CLI measurement to be performed by the UE; and/or means for receiving, from the UE, a CLI report indicating the UE-to-UE CLI measurement and assistance information associated with the UE-to-UE CLI measurement. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
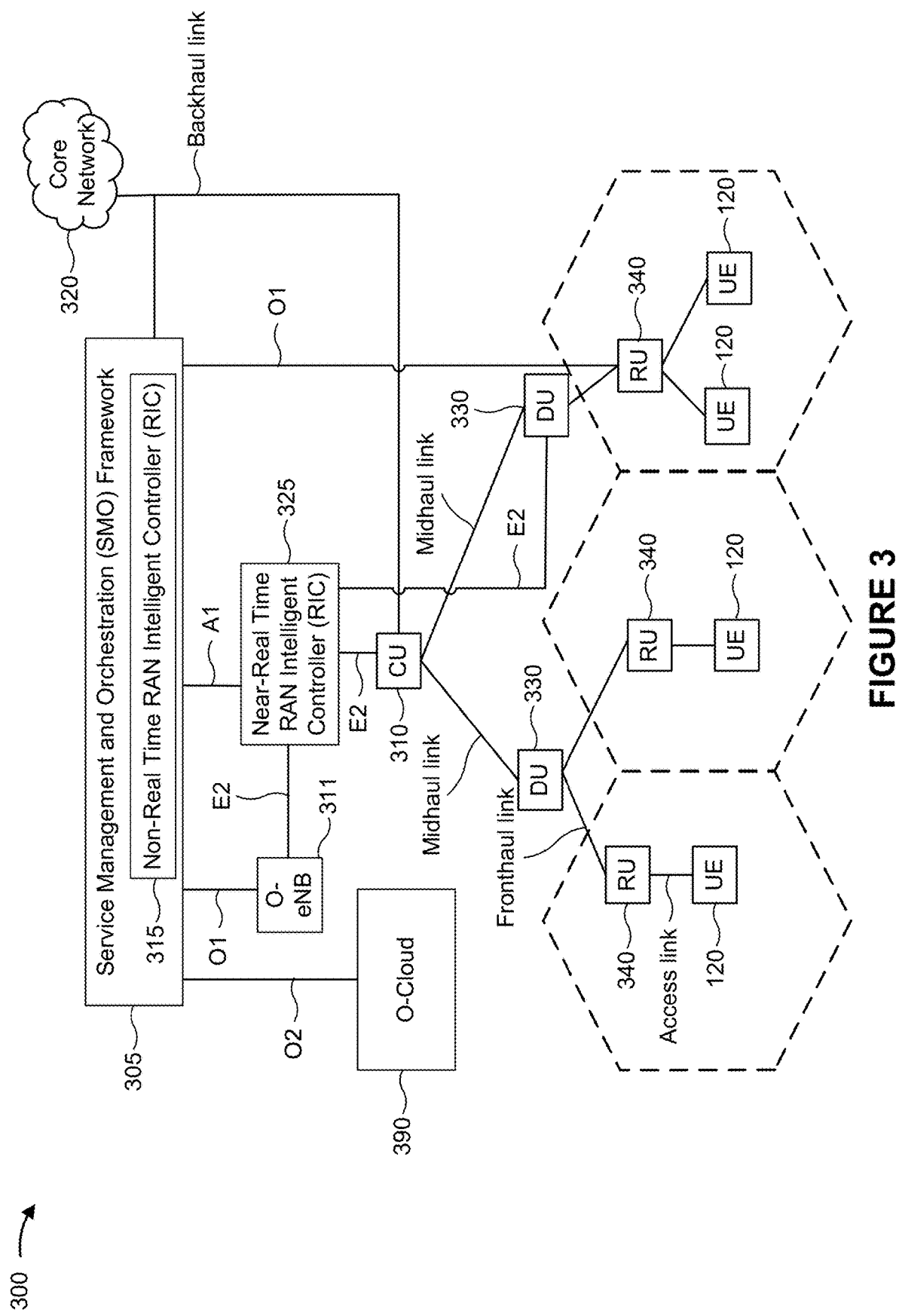
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or PRACH extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an 02 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

FIGS. 4A-4C are diagrams illustrating examples 400, 410, 420 of full duplex (FD) communication in accordance with the present disclosure. "Full duplex communication" (or "FD communication") in a wireless network refers to simultaneous bi-directional communication between devices in the wireless network. For example, a UE operating in an FD mode may transmit an uplink communication and receive a downlink communication at the same time (for example, in the same slot or the same symbol). A network node operating in an FD mode may transmit a downlink communication and receive an uplink communication at the same time (for example, in the same slot or the same symbol). "Half-duplex (HD) communication" in a wireless network refers to unidirectional communications (for example, only downlink communication or only uplink communication) between devices at a given time (for example, in a given slot or a given symbol).

The example 400 of FIG. 4A includes a UE 402 and two network nodes (for example, TRPs) 404-1, 404-2, where the UE 402 is sending uplink (UL) transmissions to the network node 404-1 and is receiving downlink (DL) transmissions from the network node 404-2. In the example 400 of FIG.

4A, FD is enabled for the UE1 402, but not for the network nodes 404-1, 404-2. The example 410 of FIG. 4B includes two UEs, shown as UE1 402-1 and UE2 402-2, and a network node 404, where the UE1 402-1 is receiving a DL transmission from the network node 404 and the UE2 402-2 is transmitting an UL transmission to the network node 404. In the example 410 of FIG. 4B, FD is enabled for the network node 404, but not for the UE1 402-1 and the UE2 402-2. The example 420 of FIG. 4C includes a UE 402 and a network node 404, where the UE 402 is receiving a DL transmission from the network node 404 and the UE 402 is transmitting an UL transmission to the network node 404. In the example 420 of FIG. 4C, FD is enabled for both the UE 402 and the network node 404.

Figure 5:
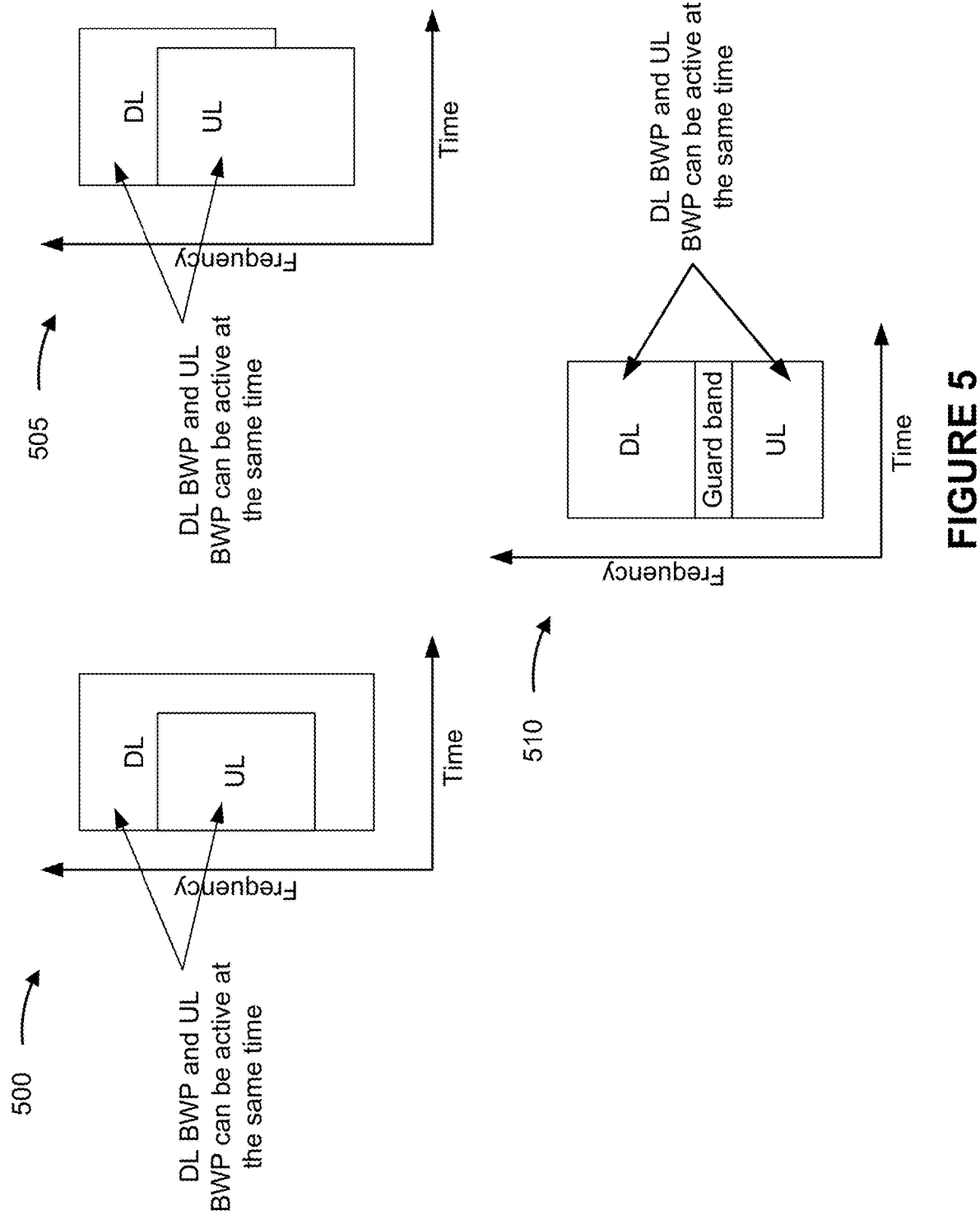
FIG. 5 is a diagram illustrating examples of FD communication in a wireless network, in accordance with the present disclosure.

FIG. 5 is a diagram illustrating examples 500, 505, and 510 of FD communication in a wireless network, in accordance with the present disclosure.

As shown in FIG. 5, examples 500 and 505 show examples of IBFD communication. In IBFD, a network node may transmit a downlink communication and receive an uplink communication on the same time and frequency resources. As shown in example 500, in a first example of IBFD, which may be referred to a "fully overlapping IBFD," the time and frequency resources for uplink communication may fully overlap with the time and frequency resources for downlink communication. As shown in example 505, in a second example of IBFD, which may be referred to as "partial overlapping IBFD," the time and frequency resources for uplink communication may partially overlap with the time and frequency resources for downlink communication.

As further shown in FIG. 5, example 510 shows an example of SBFD communication, which may also be referred to as "sub-band frequency division duplex (SBFDD)" or "flexible duplex." In SBFD, a network node may transmit a downlink communication and receive an uplink communication at the same time, but on different frequency resources. For example, the different frequency resources may be sub-bands of a frequency band, such as a time division duplexing band. In this case, the frequency resources used for downlink communication (for example, the downlink sub-band) may be separated from the frequency resources used for uplink communication (for example, the uplink sub-band), in the frequency domain, by a guard band.

Figure 6:
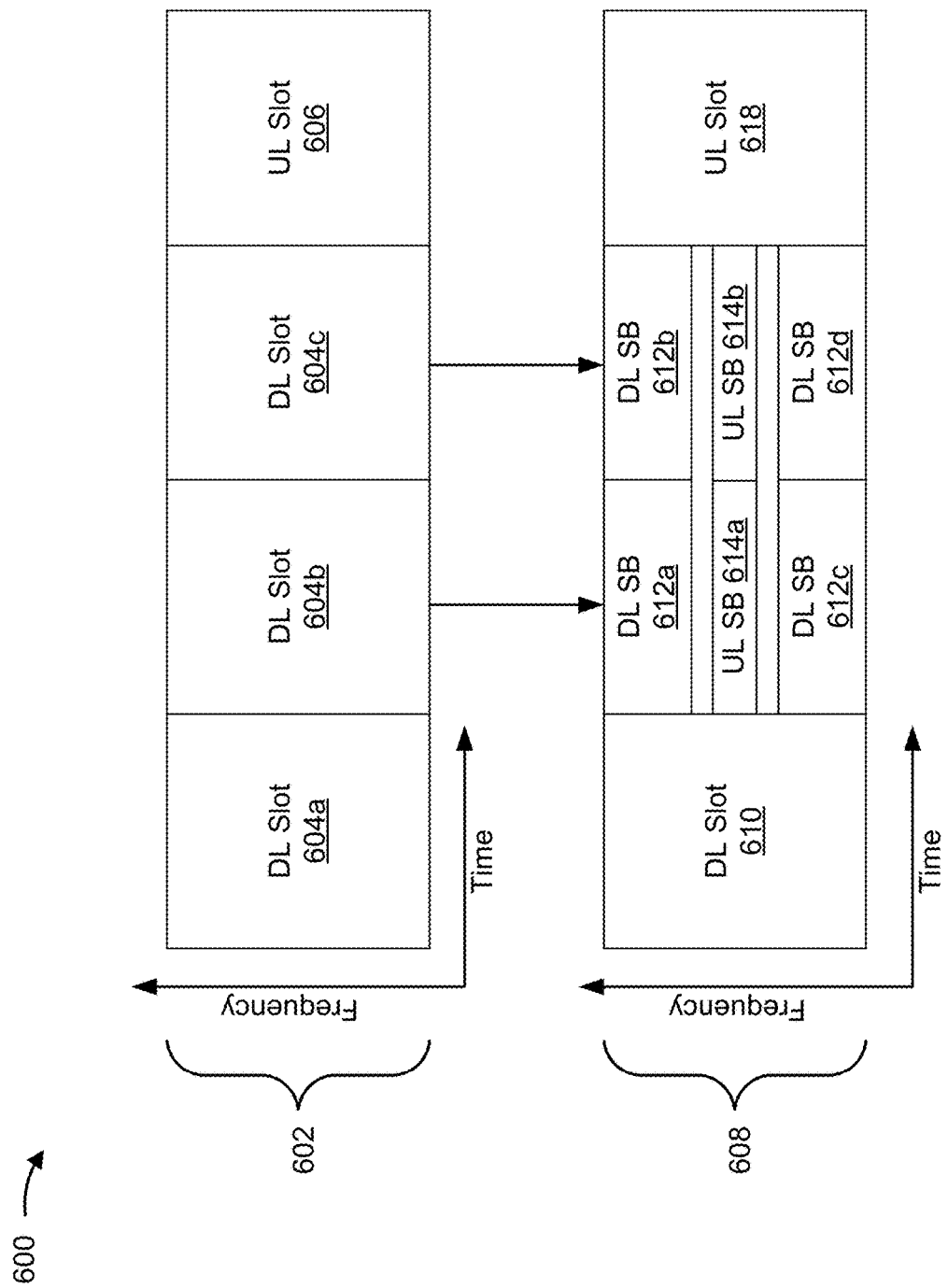
FIG. 6 is a diagram illustrating an example of sub-band full duplex (SBFD) activation, in accordance with the present disclosure.

FIG. 6 is a diagram illustrating an example 600 of SBFD activation, in accordance with the present disclosure. As shown in FIG. 6, example 600 includes a first configuration 602. In some aspects, the first configuration 602 may indicate a first slot format pattern (sometimes called a TDD pattern) associated with an HD mode or an FD mode. The first slot format pattern may include a quantity of downlink slots (for example, three downlink slots 604a, 604b, and 604c, as shown), a quantity of flexible slots (not shown), and/or a quantity of uplink slots (for example, one uplink slot 606, as shown). The first slot format pattern may repeat over time. In some examples, a network node (for example, network node 110) may indicate the first slot format pattern to a UE (for example, UE 120) using one or more slot format indicators. A slot format indicator, for a slot, may indicate whether that slot is an uplink slot, a downlink slot, or a flexible slot, among other examples.

A network node may instruct (for example, using an indication, such as an RRC message, a MAC-CE, or downlink control information (DCI)) a UE to switch from the first configuration 602 to a second configuration 608. As an alternative, the UE may indicate to the network node that the UE is switching from the first configuration 602 to the second configuration 608. The second configuration 608 may indicate a second slot format pattern that repeats over time, similar to the first slot format pattern. In any of the examples described above, the UE may switch from the first configuration 602 to the second configuration 608 during a time period (for example, a quantity of symbols and/or an amount of time (for example, in ms)) based on or otherwise associated with an indication received from the network node (for example, before switching back to the first configuration 602). During that time period, the UE may communicate using the second slot format pattern, and then may revert to using the first slot format pattern after the end of the time period. The time period may be indicated by the network node (for example, in the instruction to switch from the first configuration 602 to the second configuration 608, as described above) and/or based on or otherwise associated with a programmed and/or otherwise preconfigured rule. For example, the rule may be based on or otherwise associated with a table (for example, defined in 3GPP specifications and/or another wireless communication standard) that associates different sub-carrier spacings (SCSs) and/or numerologies (for example, represented by p and associated with corresponding SCSs) with corresponding time periods for switching configurations.

In example 600, the second slot format pattern includes a downlink slot 610, two SBFD slots in place of what were downlink slots in the first slot format pattern, and an uplink slot 618. In example 600, each SBFD slot includes at least one downlink sub-band (SB) (for example, DL SBs 612a, 612b, 612c, and 612d, as shown) and at least one uplink SB (for example, UL SBs 614a and 614b, as shown). Accordingly, the UE may operate using the second slot format pattern to transmit an uplink communication in an earlier slot (for example, the second slot in sequence, shown as partial UL slot 614a), as compared to using the first slot format pattern (for example, the fourth slot in sequence, shown as UL slot 606). Other examples may include additional or alternative changes. For example, the second configuration 608 may indicate an SBFD slot in place of what was an uplink slot in the first configuration 602 (for example, UL slot 606). In another example, the second configuration 608 may indicate a downlink slot or an uplink slot in place of what was an SBFD slot in the first configuration 602 (not shown in FIG. 6). In yet another example, the second configuration 608 may indicate a downlink slot or an uplink slot in place of what was an uplink slot or a downlink slot, respectively, in the first configuration 602. An "SBFD slot" may refer to a slot in which an SBFD format is used. An SBFD format may include a slot format in which full duplex communication is supported (for example, for both uplink and downlink communications), with one or more frequencies used for an uplink SB of the slot being separated from one or more frequencies used for a downlink SB of the slot by a guard band. In some examples, the SBFD format may include a single uplink SB and a single downlink SB separated by a guard band. In some examples, the SBFD format may include multiple downlink SBs and a single uplink SB that is separated from the multiple downlink SBs by respective guard bands (for example, as shown in FIG. 6). In some examples, an SBFD format may include multiple uplink SBs and a single downlink SB that is separated from the multiple uplink SBs by respective guard bands. In some examples, the SBFD format may include multiple uplink SBs and multiple downlink SBs, where each uplink SB is separated from a downlink SB by a guard band. In some examples, operating using an SBFD mode may include activating or using an FD mode in one or more slots based on or otherwise associated with the one or more slots having the SBFD format. A slot may support the SBFD mode if an UL bandwidth part (BWP) and a DL BWP are permitted to be or are simultaneously active in the slot in an SBFD fashion (for example, with guard band separation).

By switching from the first configuration 602 to the second configuration 608, the network node and the UE may experience increased quality and/or reliability of communications. For example, the network node and the UE may experience increased throughput (for example, using an FD mode), reduced latency (for example, the UE 120 may be able to transmit an uplink communication and/or receive a downlink communication sooner using the second configuration 608 rather than the first configuration 602), and increased network resource utilization (for example, by using both the DL BWP and the UL BWP simultaneously instead of only the DL BWP or the UL BWP).

Figure 7:
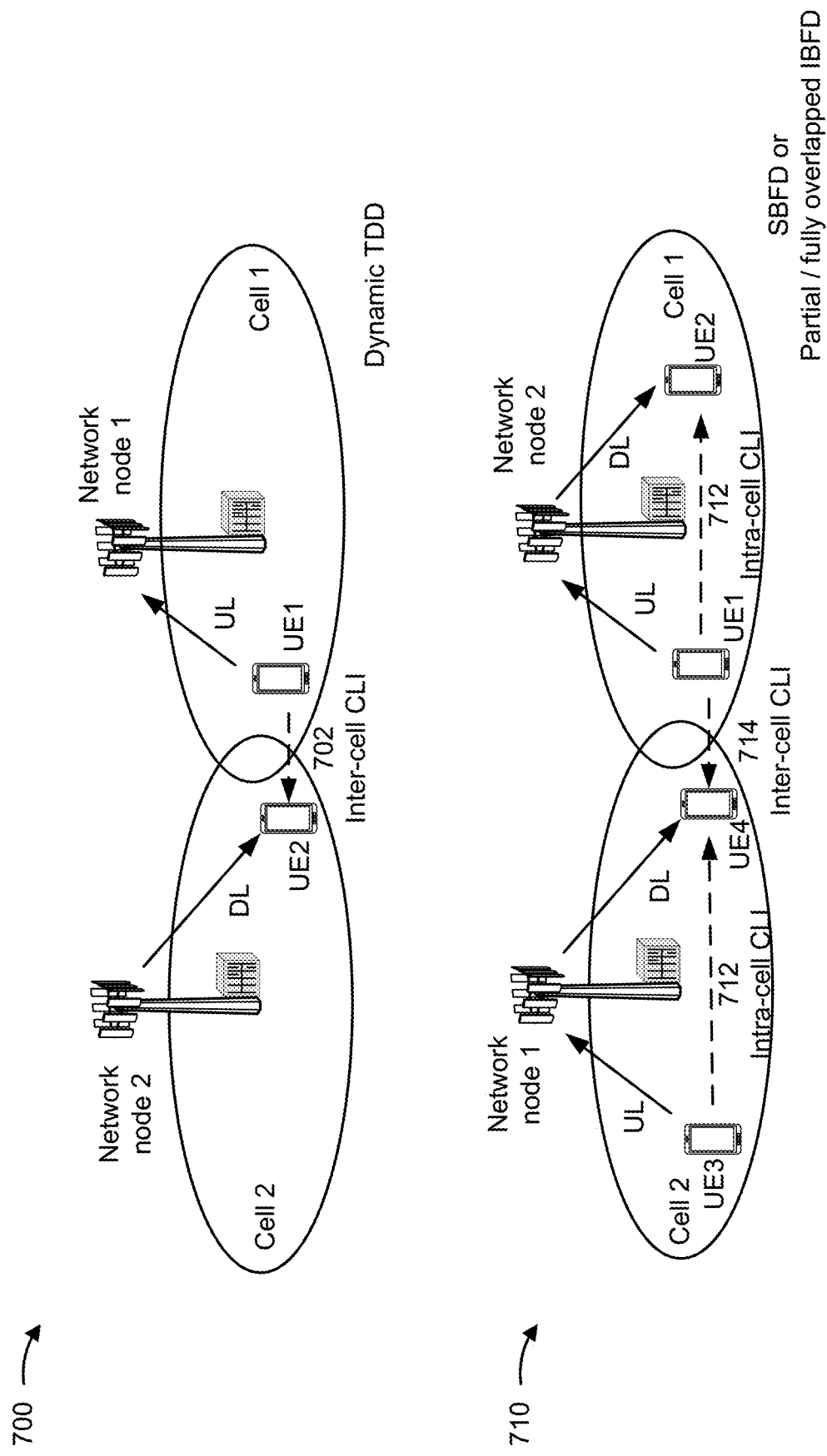
FIG. 7 is a diagram illustrating examples relating to UE-to-UE cross-link interference (CLI), in accordance with the present disclosure.

FIG. 7 is a diagram illustrating examples 700 and 710 relating to UE-to-UE CLI, in accordance with the present disclosure.

Example 700 shows an example of dynamic TDD communication. As shown in example 700, when dynamic TDD is implemented, neighboring cells (cell 1 and cell 2) may use different TDD configurations to communicate with UEs, which may result in an uplink communication between a first UE (UE1) and a first network node (network node 1) in a same transmission time interval (TTI) as a downlink communication between a second network node (network node 2) and a second UE (UE2). These communications in different transmission directions (for example, downlink versus uplink) in the same TTI may interfere with one another, which may be referred to as CLI. Interference with reception of a downlink communication by one UE caused by transmission of an uplink communication by another UE may be referred to as UE-to-UE CLI or inter-UE CLI.

For example, as shown by reference number 702, in the dynamic TDD scenario, transmission of the uplink communication in a symbol or a slot by UE1 in cell 1 may interfere with reception of the downlink communication in the symbol or the slot by UE2 in cell 2. Such interference may be referred to as inter-cell UE-to-UE CLI or inter-cell inter-UE CLI.

Example 710 shows an example of FD communication, such as SBFD, fully overlapping IBFD, or partial overlapping IBFD. As shown by reference number 712, in an FD scenario, transmission of an uplink communication in an SBFD or IBFD slot or symbol by one UE in a cell may interfere with reception of a downlink communication in the SBFD or IBFD slot or symbol by another UE in the cell. For example, transmission of an uplink communication in an SBFD or IBFD slot or symbol by a first UE (UE1) in a first cell (cell 1) may interfere with reception of a downlink communication in the SBFD or IBFD slot or symbol by a second UE (UE2) in cell 1. As another example, transmission of an uplink communication in an SBFD or IBFD slot or symbol by a third UE (UE3) in a second cell (cell 2) may interfere with reception of a downlink communication in the SBFD or IBFD slot or symbol by a fourth UE (UE4) in cell 2. Such interference may be referred to as intra-cell UE-to-UE CLI or intra-cell inter-UE CLI. In an SBFD scenario, transmission of an uplink communication on an uplink sub-band (SB) in an SBFD symbol or slot by one UE (for example, UE1) in a cell (for example, cell 1) may interfere with reception of a downlink communication on a downlink SB in the SBFD symbol or slot by another UE (for example, UE2) in the cell. Such interference may be referred to as inter-SB intra-cell UE-to-UE CLI or inter-SB intra-cell inter-UE CLI.

As shown by reference number 714, in an FD scenario, transmission of an uplink communication in an SBFD or an IBFD symbol or slot by UE1 in cell 1 may interfere with reception of a downlink communication in the SBFD of IBFD symbol or slot by UE4 in cell 2. Such interference may be referred to as inter-cell inter-UE CLI. In an SBFD scenario, transmission of an uplink communication on an uplink SB in an SBFD symbol or slot by UE1 in cell 1 may interfere with reception of a downlink communication on a downlink SB in the SBFD symbol or slot by UE4 in cell 2. Such interference may be referred to as inter-SB inter-cell inter-UE CLI.

Figure 8A:
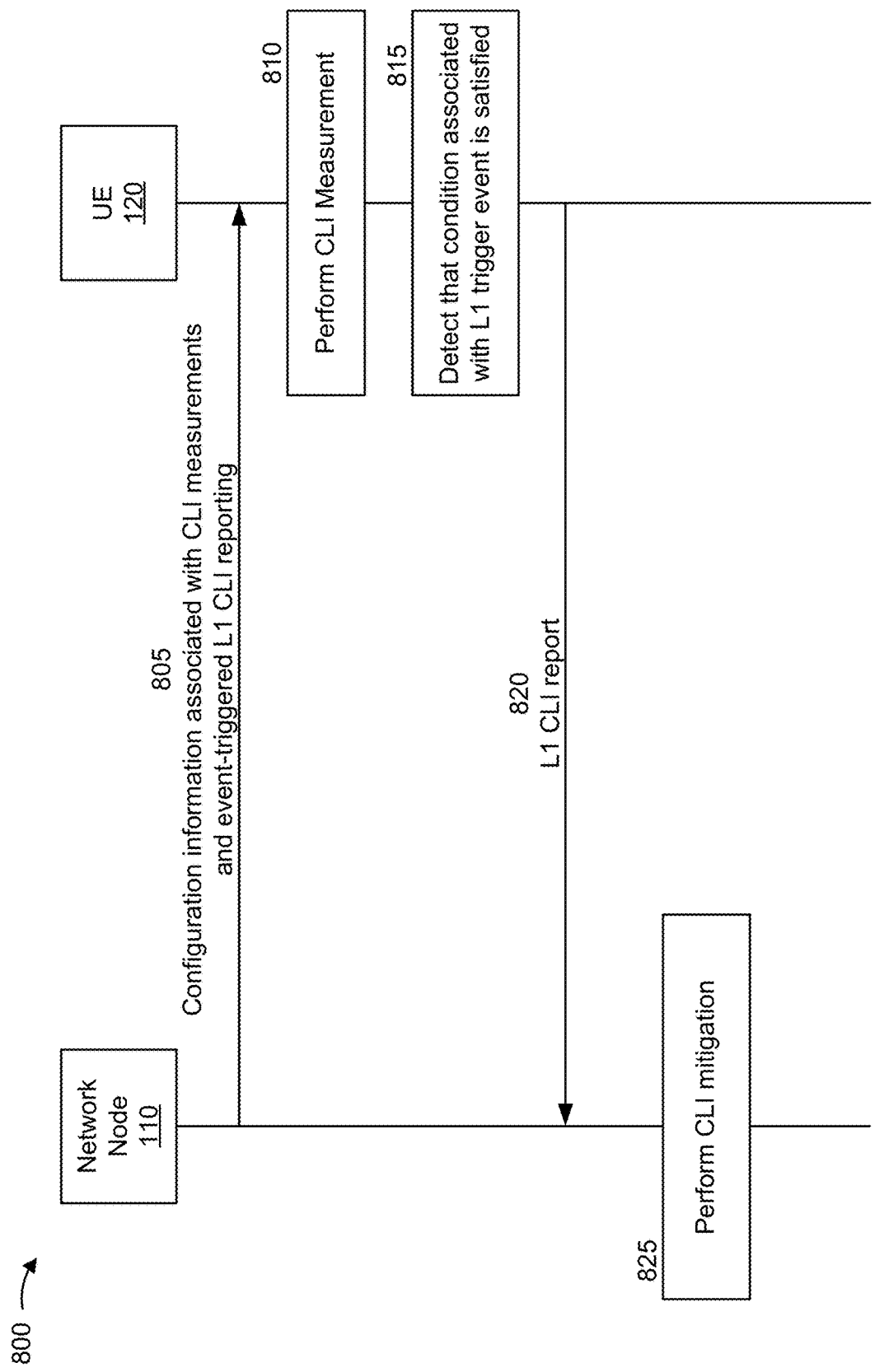
FIGS. 8A-8B are diagrams illustrating an example associated with event-triggered layer 1 (L1) CLI reporting, in accordance with the present disclosure.
Figure 8B:
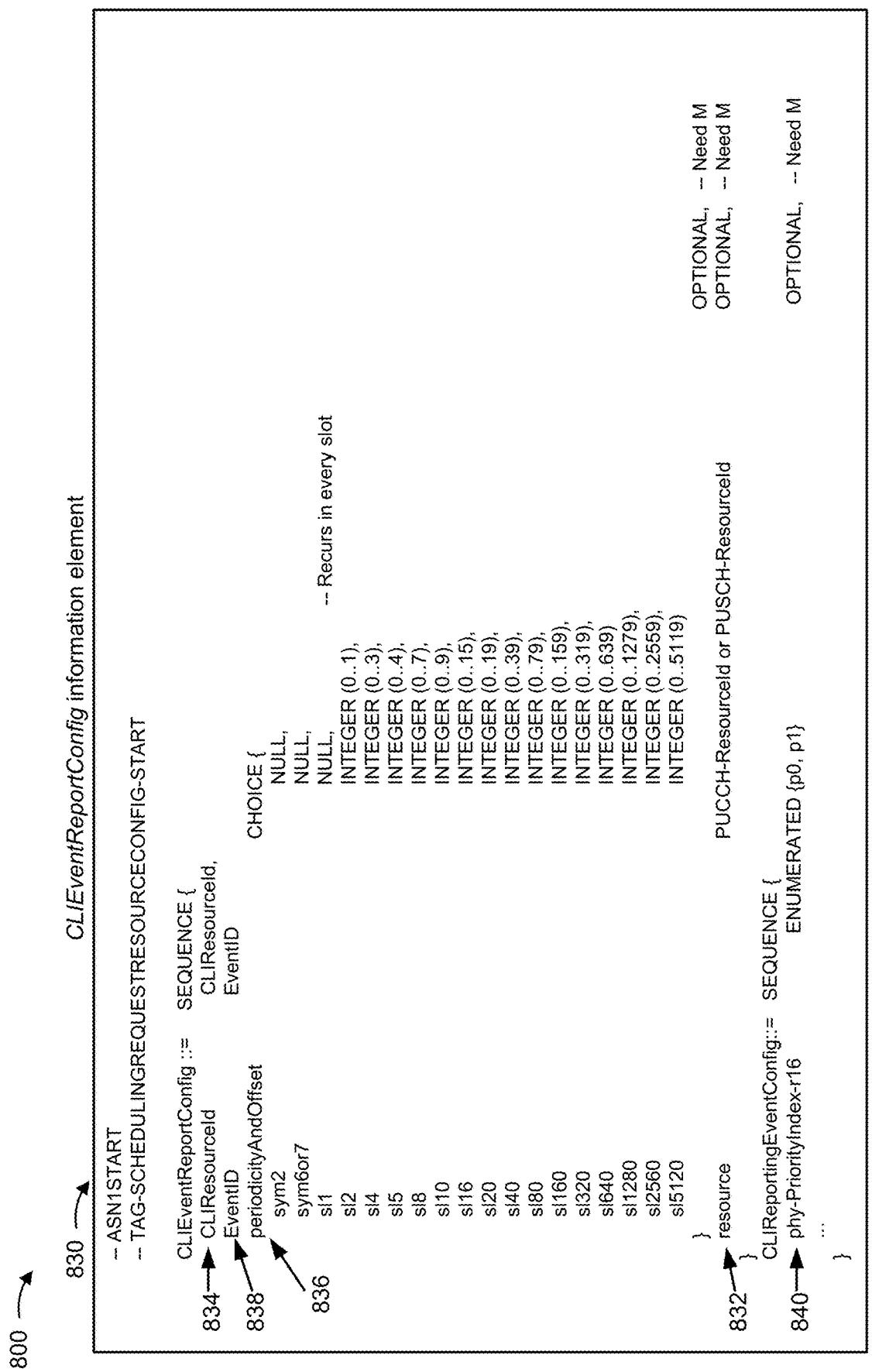

FIGS. 8A-8B are diagrams illustrating an example 800 associated with event-triggered L1 CLI reporting, in accordance with the present disclosure. As shown in FIG. 8A, example 800 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 8A, in a first operation 805, the network node 110 may transmit, and the UE 120 may receive, configuration information associated with CLI measurements and event-triggered L1 CLI reporting. For example, the configuration may be included in one or more RRC messages, one or more MAC-CEs, or DCI. In some aspects, the configuration information may indicate one or more CLI resources on which respective CLI measurements are to be performed by the UE 120. For example, the CLI resources may be time and frequency resources on which the UE 120 is to perform UE-to-UE CLI measurements. In such examples, the UE 120 may be a victim UE configured to measure, on the CLI resources, UE-to-UE CLI at the UE 120 caused by one or more aggressor UEs. In some aspects, the network node 110 may transmit, to the one or more aggressor UEs, configuration information that configures the one or more aggressor UEs to transmit a signal (for example, an uplink reference signal, such as a sounding reference signal (SRS)) on the one or more CLI resources to be measured by the UE 120.

In some aspects, the configuration information may configure the UE 120 with a CLI resource, on which a UE-to-UE CLI measurement is to be performed, in at least one of a downlink sub-band or an uplink sub-band of an SBFD slot or symbol. In such examples, the UE-to-UE CLI measurement to be performed by the UE 120 may be a measurement of inter-SB intra-cell UE-to-UE CLI or a measurement of inter-SB inter-cell UE-to-UE CLI. Additionally or alternatively, the configuration information may configure the UE 120 with a CLI resource, on which a UE-to-UE CLI measurement is to be performed, in at least one of a fully overlapping IBFD slot or symbol or a partial overlapping IBFD slot or symbol. In such examples, the UE-to-UE CLI measurement to be performed by the UE 120 may be an intra-cell UE-to-UE CLI measurement or an inter-cell UE-to-UE CLI measurement. Additionally or alternatively, the configuration information may configure the UE 120 with a CLI resource, on which a UE-to-UE CLI measurement is to be performed in a dynamic TDD slot or symbol (for example, in a downlink dynamic TDD slot or symbol). In such examples, the UE-to-UE CLI measurement to be performed by the UE 120 may be an inter-cell UE-to-UE CLI measurement.

In some aspects, the configuration information may indicate a condition associated with an L1 trigger event that triggers Li CLI reporting by the UE 120. The condition associated with the L1 trigger event may be a triggering condition for triggering L1 CLI reporting by the UE 120. That is, when the condition is satisfied, the L1 trigger event triggers L1 CLI reporting by the UE 120. In some aspects, the condition associated with the L1 trigger event may be associated with a CLI threshold. In such examples, the condition associated with the L1 trigger event may be satisfied in connection with a CLI measurement, performed by the UE 120, satisfying the CLI threshold. For example, the CLI threshold may be a CLI RSRP threshold, a CLI RSSI threshold, or a CLI SINR threshold, among other examples. In some aspects, the configuration information may indicate the CLI threshold, and the triggering condition associated with the threshold. In some examples, the CLI measurement (for example, a CLI RSRP measurement, a CLI RSSI measurement, or a CLI SINR measurement) may satisfy the CLI threshold (for example, the CLI RSRP threshold, the CLI RSSI threshold, or the CLI SINR threshold), and thus satisfy the condition associated with Li trigger event, when the CLI measurement is greater than the CLI threshold or greater than or equal to the CLI threshold. In other examples, the CLI measurement (for example, a CLI RSRP measurement, a CLI RSSI measurement, or a CLI SINR measurement) may satisfy the CLI threshold (for example, the CLI RSRP threshold, the CLI RSSI threshold, or the CLI SINR threshold), and thus satisfy the condition associated with the L1 event, when the CLI measurement is less than the CLI threshold or less than or equal to the CLI threshold.

In some aspects, the configuration information may configure and/or identify multiple different L1 trigger events, each associated with a respective condition for triggering L1 CLI reporting. For example, a first condition associated with a first L1 trigger event may be satisfied in connection with a CLI measurement being greater than a first CLI threshold, and a second condition associated with a second Li trigger event may be satisfied in connection with a CLI measurement being less than a second CLI threshold. In some aspects, a condition associated with a L1 trigger event may be associated with one or more CLI thresholds (for example, one or more of a CLI RSRP threshold, a CLI RSSI threshold, or a CLI SINR threshold). In such examples, the condition may be satisfied in connection with all of the one or more CLI thresholds being satisfied, or the condition may be satisfied in connection with at least one of the one or more CLI thresholds being satisfied.

In some other aspects, one or more L1 trigger events and/or the conditions associated with the one or more L1 trigger events may be defined or identified in a wireless communication standard (for example, a 3GPP standard). In such examples, the UE 120 may store information associated with the one or more L1 trigger events and/or the conditions associated with the one or more L1 trigger events.

In some aspects, the configuration information may configure periodic (or semi-persistent) uplink resources (for example, periodic physical uplink control channel (PUCCH) resources or periodic physical uplink shared channel (PUSCH) resources) reserved for L1 CLI reporting in connection with an L1 trigger event. For example, periodic uplink resources may be reserved every x ms for carrying CLI report contents in connection with event-triggered Li CLI reporting. In some aspects, an information element (IE) associated with event-triggered Li CLI reporting may be defined. For example, the IE may be transmitted from the network node 110 to the UE 120 in an RRC message, and the IE may include configuration information indicating the periodic uplink resources reserved for event-triggered L1 CLI reporting, as well as other information associated with event-triggered L1 CLI reporting.

FIG. 8B shows an example of an IE 830 associated with event-triggered L1 CLI reporting. In some examples, the IE 830 associated with event-triggered L1 reporting may be referred to as a CLIEventReportConfig IE. As shown in FIG. 8B, the IE 830 may include uplink resource configuration information 832 that indicates one or more periodic uplink resources reserved for transmitting an L1 CLI report triggered in connection with an L1 trigger event. For example, the uplink resource configuration information 832 may indicate at least one PUCCH resource identifier (PUCCH-ResourceId) associated with at least one periodic PUCCH resource or at least one PUSCH resource identifier (PUSCH-ResourceId) associated with at least one periodic physical downlink shared channel (PDSCH) resource. In some examples, the uplink resource configuration information 832 may configure periodic uplink resources for transmitting an L1 CLI report including a 1 bit indication (or multiple bit indication) that a condition associated with a L1 trigger event is satisfied (for example, that CLI measurement satisfies a CLI threshold). In some examples, the uplink resource configuration information 832 may configured periodic uplink resources for transmitting an L1 CLI report including N bits for indicating one or more CLI metrics (for example, CLI RSRP, CLI RSSI, and/or CLI SINR, among other examples).

As further shown in FIG. 8B, the IE 830 may include CLI resource configuration information 834 that indicates at least one CLI resource on which a CLI measurement is to be performed by the UE 120. For example, the CLI resource configuration information 834 may indicate a CLI resource identifier (CLIResourceId). In some examples, the CLI resource identifier may be associated with a single CLI resource on which the CLI measurement is to be performed. In some other examples, the CLI resource identifier may be associated with or mapped to a CLI resource list including multiple CLI resources on which CLI measurements are to be performed. In some aspects, the IE 830 may include periodicity and offset configuration information 836 that indicates a periodicity and an offset for the CLI resource configured for the CLI measurement. In some examples, the periodicity and offset configuration information 836 may indicate a respective periodicity and a respective offset for each of multiple CLI resources indicated by the CLI resource configuration information 834. In this way, the IE 830 may configure periodic CLI measurements in one or more periodically occurring CLI resources.

As further shown in FIG. 8B, the IE 830 may include L1 trigger event configuration information 838. The L1 trigger event configuration information 838 may indicate one or more event identifiers (EventID) associated with one or more L1 trigger events, respectively. Each L1 trigger event may be associated with at least one respective CLI threshold to be compared with at least one CLI metric to determine whether a triggering condition associated with the L1 trigger event is satisfied. In some examples, each Li trigger event indicated by the L1 trigger event configuration information 838 may be associated with a respective CLI threshold. In some other examples, an L1 trigger event indicated by the L1 trigger event configuration information 838 may be associated with multiple CLI thresholds. In some aspects, the respective thresholds associated with the one or more Li trigger events (for example, the respective at least one threshold associated with each L1 trigger event) may be identified or indicated in another IE (for example, an IE other than the IE 830 in which the L1 trigger event information 838 in included) that is transmitted by the network node 110 and received by the UE 120. In some other aspects, the IE 830 may include configuration information that indicates the respective thresholds associated with the one or more L1 trigger events (for example, the respective at least one threshold associated with each Li trigger event). For example, the thresholds may be indicated in the L1 trigger event configuration information 838 or other configuration information included in the IE 830.

As further shown in FIG. 8B, the IE 830 may include priority configuration information 840 indicating a physical priority index (phy-PriorityIndex) for the L1 CLI report to be transmitted on the reserved periodic uplink resources in connection with an L1 trigger event. The physical priority index indicates a priority associated with the transmission of the CLI report on the uplink resources (for example, PUCCH resources or PUSCH resources).

Returning to FIG. 8A, in some aspects, the configuration information transmitted by the network node 110, and received by the UE 120, in the first operation 805 may configure the UE 120 for SR-based event-triggered L1 CLI reporting. In such examples, the configuration information may indicate a CLI threshold (for example, a CLI RSRP threshold or a CLI RSSI threshold) associated with an Li trigger event that triggers SR-based L1 CLI reporting. For example, a threshold parameter (for example, cli-rsrp-Threshold or cli-rssi-Threshold) may be defined for configuring the CLI RSRP or CLI RSSI threshold associated with SR-based L1 CLI reporting, and the configuration information may configure a value for the threshold parameter (for example, cli-rsrp-Threshold or cli-rssi-Threshold) within a range of values (for example, RSRP-Range or RSSI-Range). In some examples, the configuration information may configure multiple L1 trigger events that trigger SR-based Li CLI reporting, for example by indicating respective CLI thresholds for the multiple L1 trigger events. For example, the different L1 trigger events may trigger SR-based Li CLI reporting responsive to, based on, or otherwise associated with CLI thresholds for different CLI metrics (for example, CLI RSRP, CLI RSSI, and/or CLI SINR, among other examples), different CLI threshold values for a same CLI metric (for example, CLI RSRP, CLI RSSI, or CLI SINR, among other examples), different conditions for satisfying a CLI threshold (for example, a CLI measurement greater than or less than a CLI threshold), or a combination thereof. In some examples, the configuration information may configure an SR identifier (ID) to be used to indicate that an SR is associated with event-triggered L1 CLI reporting. For example, the configuration information may configure a parameter (for example, schedulingRequestID-CLI-r19) for indicating an SR ID associated with event-triggered L1 CLI reporting with an SR ID value (SchedulingRequestId).

In some aspects, the configuration information may configure the UE 120 for PRACH-based event-triggered L1 CLI reporting. In such examples, the configuration information may indicate a CLI threshold (for example, a CLI RSRP threshold or a CLI RSSI threshold) associated with an L1 trigger event that triggers PRACH-based L1 CLI reporting. For example, a threshold parameter (for example, cli-rsrp-Threshold or cli-rssi-Threshold) may be defined for configuring the CLI RSRP or CLI RSSI threshold associated with PRACH-based L1 CLI reporting, and the configuration information may configure a value for the threshold parameter (for example, cli-rsrp-Threshold or cli-rssi-Threshold) within a range of values (for example, RSRP-Range or RSSI-Range). In some examples, the configuration information may configure multiple L1 trigger events that trigger PRACH-based L1 CLI reporting, for example by indicating respective CLI thresholds for the multiple L1 trigger events. For example, the different L1 trigger events may trigger PRACH-based L1 CLI reporting responsive to, based on, or otherwise associated with CLI thresholds for different CLI metrics (for example, CLI RSRP, CLI RSSI, and/or CLI SINR, among other examples), different CLI threshold values for a same CLI metric (for example, CLI RSRP, CLI RSSI, or CLI SINR, among other examples), different conditions for satisfying a CLI threshold (for example, a CLI measurement greater than or less than a CLI threshold), or a combination thereof. In some examples, the configuration information, or other configuration transmitted by the network node 110, may configure one or more RACH resources for CFRA that may be used by the UE 120 for PRACH-based L1 CLI reporting. For example, the one or more RACH resources for CFRA may include one or more ROs associated with CFRA.

In some aspects, the configuration information may configure the UE 120 for SR-based and PRACH-based event-triggered L1 CLI reporting. In such examples, the configuration information may configure a same CLI threshold (or CLI thresholds) may be configured for SR-based and PRACH-based event-triggered L1 CLI reporting, or different CLI thresholds may be configured for SR-based and PRACH-based event-triggered L1 CLI reporting.

As further shown in FIG. 8A, in a second operation 810, the UE 120 may perform a CLI measurement. The CLI measurement may be a UE-to-UE CLI measurement. The UE 120 may perform the UE-to-UE CLI measurement on a CLI resource indicated in the configuration information. For example, the UE 120 may measure one or more CLI metrics, such as CLI RSRP, CLI RSSI, and/or CLI SINR, among other examples, on the CLI resource. The UE 120 may measure the one or more CLI metrics based on or otherwise associated with a signal (for example, an uplink reference signal, such as an SRS) transmitted by another UE (for example, an aggressor UE) on the CLI resource.

In some aspects, the UE 120 may perform the UE-to-UE CLI measurement (for example, an inter-SB intra-cell UE-to-UE CLI measurement or an inter-SB inter-cell UE-to-UE CLI measurement) in a downlink sub-band or an uplink sub-band of an SBFD slot or symbol. In some aspects, the UE 120 may perform the UE-to-UE CLI measurement (for example, an intra-cell UE-to-UE CLI measurement or an inter-cell UE-to-UE CLI measurement) in a fully overlapping IBFD slot or symbol or a partial overlapping IBFD slot or symbol. In some aspects, the UE 120 may perform the UE-to-UE CLI measurement (for example, an inter-cell UE-to-UE CLI measurement) in a downlink dynamic TDD slot or symbol.

As further shown in FIG. 8A, in a third operation 815, the UE 120 may detect that a condition associated with an L1 trigger event is satisfied. The UE 120 may detect whether the condition associated with the L1 trigger event is satisfied based on or otherwise associated with the UE-to-UE CLI measurement performed by the UE 120. In some aspects, the UE 120 may detect that the condition associated with the L1 trigger event is satisfied in connection with the UE-to-UE CLI measurement satisfying a CLI threshold associated with the L1 trigger event. For example, the CLI threshold may correspond to a CLI metric, and the UE 120 may compare a value for the CLI metric measured by the UE 120 to the CLI threshold to determine whether the UE-to-UE CLI measurement satisfies the CLI metric. In some examples, the UE 120 may detect that the condition associated with the L1 trigger event is satisfied in connection with a determination that a measured CLI RSRP value satisfies a CLI RSRP threshold. In some examples, the UE 120 may detect that the condition associated with the L1 trigger event is satisfied in connection with a determination that a measured CLI RSSI value satisfies a CLI RSSI threshold. In some examples, the detect that the condition associated with the L1 trigger event is satisfied in connection with a determination that a measured CLI SINR value satisfies a CLI SINR threshold.

In some examples, the UE 120 may detect that the condition associated with the L1 trigger event is satisfied in connection with a determination that the UE-to-UE CLI measurement satisfies at least one CLI threshold, of multiple CLI thresholds associated with the L1 trigger event. In some examples, the UE 120 may detect that the condition associated with the L1 trigger event is satisfied in connection with a determination that the UE-to-UE CLI measurement satisfies each CLI threshold, of multiple CLI thresholds associated with the L1 trigger event.

As further shown in FIG. 8A, in a fourth operation 820, the UE 120 may transmit, and the network node 110 may receive, an L1 CLI report in connection with the condition associated with the L1 trigger event being satisfied. For example, transmission of the L1 CLI report, by the UE 120, may be triggered by the condition associated with the L1 trigger event being satisfied. That is, the UE 120 may transmit the L1 CLI report responsive to, based on, or otherwise associated with detecting that the condition associated with the L1 trigger event is satisfied. In some aspects, the L1 CLI report may be included in uplink control information (UCI) transmitted via PUCCH or PUSCH resources.

In some aspects, the UE 120 may transmit the L1 CLI report on one or more periodic (or semi-persistent) uplink resources reserved for L1 CLI reporting in connection with an L1 trigger event. For example, the one or more periodic uplink resources may be dedicated periodic PUCCH or PUSCH resources for event-triggered L1 CLI reporting. The one or more periodic uplink resources may be configured in an IE associated with event-triggered L1 CLI reporting, such as the IE 830 shown in FIG. 8B. In some examples, the L1 CLI report transmitted on the dedicated periodic uplink resources may include a one bit indication (or a multi-bit indication) that the condition associated with the L1 trigger event is satisfied (for example, an indication that the UE-to-UE measurement satisfies the CLI threshold associated with the L1 trigger event). Additionally or alternatively, the L1 CLI report transmitted on the dedicated periodic uplink resources may include N bits that indicate one or more CLI metrics associated with the CLI measurement. For example, the one or more CLI metrics indicated in the L1 CLI report may include one or more of a measured CLI RSRP value, a measured CLI RSSI value, or a measured CLI SINR value, among other examples.

In some aspects, the UE 120 may transmit the L1 CLI report using SR-based L1 CLI reporting in connection with the condition associated with the L1 trigger event being satisfied. In some examples, the UE 120 may transmit, and the network node 110 may receive, an SR including the L1 CLI report. For example, the UE 120 may transmit the SR including the L1 CLI report in a configured SR resource. The SR, including the L1 CLI report, may be associated with an SR ID that is associated with event triggered Li CLI reporting. In such examples, the L1 CLI report may include a one bit (or multi-bit) indication that the condition associated with the L1 trigger event is satisfied (for example, the UE-to-UE CLI measurement satisfies the CLI threshold) and/or an indication of one or more CLI metrics. In such examples, a grant of uplink resources based on or otherwise associated with the SR may be optional for the network node 110. If the network node 110 grants uplink resources to the UE 120 in connection with the SR, the UE 120 may transmit additional information (for example, more detailed information) associated with the UE-to-UE CLI measurement via the granted uplink resources.

In some examples, in connection with the condition associated with the L1 trigger event being satisfied, the UE 120 may transmit, and the network node 110 may receive, an SR including an indication (for example, a one bit indication or a multi-bit indication) that the condition associated with the Li trigger event is satisfied (for example, the CLI measurement satisfies the threshold). The SR may be associated with an SR ID that is associated with event triggered Li CLI reporting. The network node 110 may transmit, and the UE 120 may receive, an uplink grant in connection with the SR. The UE 120 may then transmit, and the network node 110 may receive, the L1 CLI report based on or otherwise associated with the uplink grant. For example, the uplink grant may indicate one or more granted uplink resources, and the UE 120 may transmit the L1 CLI report in the one or more grant uplink resources indicated in the uplink grant. In such examples, the L1 CLI report may be a detailed CLI report. For example, the CLI report may include one or more CLI metrics associated with the UE-to-UE CLI measurement performed by the UE 120 and/or other information associated with the UE-to-UE CLI measurement.

In some aspects, the UE 120 may transmit the L1 CLI report using PRACH-based Li CLI reporting in connection with the condition associated with the Li trigger event being satisfied. In such examples, the UE 120 may transmit the Li CLI report in a RACH resource. For example, the UE 120 may transmit the L1 CLI report via a PRACH communication in an RO associated with CFRA. In some examples, the L1 CLI report transmitted in the RACH resource (for example, in the RO associated with CFRA) may include a one bit (or multi-bit) indication that the condition associated with the L1 trigger event is satisfied (for example, the CLI measurement satisfies the CLI threshold). Additionally or alternatively, the L1 CLI report transmitted in the RACH resource (for example, in the RO associated with CFRA) may include N bits that indicate one or more CLI metrics associated with the UE-to-UE CLI measurement performed by the UE 120. For example, the one or more CLI metrics may include one or more of a CLI RSRP, a CLI RSSI, or a CLI SINR, among other examples.

In some aspects, the event-triggered Li CLI report (for example, transmitted via dedicated periodic uplink resources, via SR-based reporting, or via PRACH-based reporting) may include assistance information associated with the UE-to-UE CLI measurement performed by the UE 120, such as a delta timing associated the UE-to-UE CLI measurement and/or a suggested power backoff for an aggressor UE associated with the UE-to-UE CLI measurement, as discussed in connection with FIG. 10.

As further shown in FIG. 8A, in a fifth operation 825, the network node 110 may perform CLI mitigation. For example, the network node 110 may apply a CLI mitigation mechanism to reduce UE-to-UE CLI on one or more downlink communications scheduled for the UE 120. The network node 110 may perform CLI mitigation responsive to, based on, or otherwise associated with the L1 CLI report received from the UE 120. For example, the network node 110 may perform CLI mitigation responsive to, based on, or otherwise associated with an indication that the CLI measurement satisfies a threshold included in the L1 CLI report and/or one or more CLI metrics included in the L1 CLI report. In some aspects, the network node 110 may perform beam switching to switch a downlink beam associated with a downlink communication to be transmitted to the UE 120 to avoid a beam with strong CLI, and thus reduce UE-to-UE CLI on the downlink communication. Additionally or alternatively, the network node 110 may switch an uplink beam associated with an uplink communication to be transmitted by an aggressor UE to a different uplink beam that reduces UE-to-UE CLI on the downlink communication to be transmitted by the UE 120. In some aspects, the network node 110 may switch a pairing of UEs scheduled for simultaneous (or overlapping) downlink and uplink communications. For example, the network node 110 may switch a UE scheduled for uplink communications in a same slot or symbol as the UE 120 is scheduled for downlink communications from an aggressor UE causing strong UE-to-UE CLI on the downlink communications of the UE 120. In some aspects, the network node 110 may perform CLI mitigation by causing an aggressor UE to reduce a transmit power of uplink communications transmitted by the aggressor UE.

Figure 9:
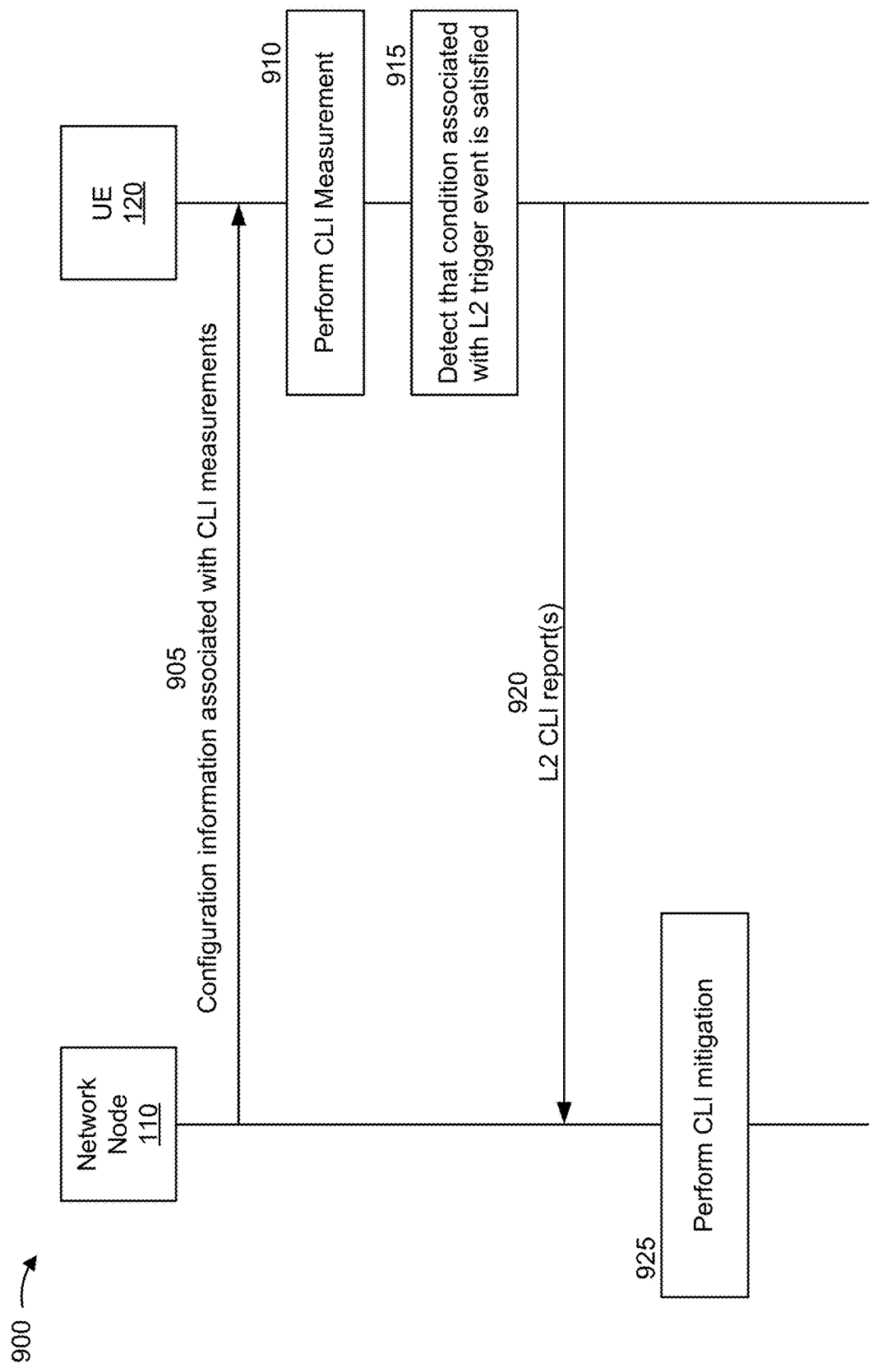
FIG. 9 is a diagram illustrating an example associated with event-triggered layer 2 (L2) CLI reporting, in accordance with the present disclosure.

FIG. 9 is a diagram illustrating an example 900 associated with event-triggered L2 CLI reporting, in accordance with the present disclosure. As shown in FIG. 9, example 900 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 9, in a first operation 905, the network node 110 may transmit, and the UE 120 may receive configuration information associated with CLI measurements. For example, the configuration may be included in one or more RRC messages, one or more MAC-CEs, or DCI. In some aspects, the configuration information may indicate one or more CLI resources on which respective CLI measurements are to be performed by the UE 120. For example, the CLI resources may be time and frequency resources on which the UE 120 is to perform UE-to-UE CLI measurements. In such examples, the UE 120 may be a victim UE configured to measure, on the CLI resources, UE-to-UE CLI at the UE 120 caused by one or more aggressor UEs. In some aspects, the network node 110 may transmit, to the one or more aggressor UEs, configuration information that configures the one or more aggressor UEs to transmit a signal (for example, an uplink reference signal, such as an SRS) on the one or more CLI resources to be measured by the UE 120. In some aspects, the configuration information may configured one or more periodic CLI measurement resources, one or more semi-persistent CLI measurement resources, and/or one or more aperiodic CLI measurement resources.

In some aspects, the configuration information may configure the UE 120 with a CLI resource, on which a UE-to-UE CLI measurement is to be performed, in at least one of a downlink sub-band or an uplink sub-band of an SBFD slot or symbol. In such examples, the UE-to-UE CLI measurement to be performed by the UE 120 may be a measurement of inter-SB intra-cell UE-to-UE CLI or a measurement of inter-SB inter-cell UE-to-UE CLI. Additionally or alternatively, the configuration information may configure the UE 120 with a CLI resource, on which a UE-to-UE CLI measurement is to be performed, in at least one of a fully overlapping IBFD slot or symbol or a partial overlapping IBFD slot or symbol. In such examples, the UE-to-UE CLI measurement to be performed by the UE 120 may be an intra-cell UE-to-UE CLI measurement or an inter-cell UE-to-UE CLI measurement. Additionally or alternatively, the configuration information may configure the UE 120 with a CLI resource, on which a UE-to-UE CLI measurement is to be performed in a dynamic TDD slot or symbol (for example, in a downlink dynamic TDD slot or symbol). In such examples, the UE-to-UE CLI measurement to be performed by the UE 120 may be an inter-cell UE-to-UE CLI measurement.

In some aspects, the configuration information may include configuration information associated with event-triggered L2 CLI reporting. For example, the configuration information may indicate a condition associated with an L2 trigger event that triggers L2 CLI reporting by the UE 120. The condition associated with the L2 trigger event may be a triggering condition for triggering L2 CLI reporting by the UE 120. That is, when the condition is satisfied, the L2 trigger event triggers L2 CLI reporting by the UE 120. In some aspects, the condition associated with the L2 trigger event may be associated with a CLI threshold. In such examples, the condition associated with the L2 trigger event may be satisfied in connection with a CLI measurement, performed by the UE 120, satisfying the CLI threshold. For example, the CLI threshold may be a CLI RSRP threshold, a CLI RSSI threshold, or a CLI SINR threshold, among other examples. In some aspects, the configuration information may indicate the CLI threshold and the triggering condition associated with the threshold. In some examples, the CLI measurement (for example, a CLI RSRP measurement, a CLI RSSI measurement, or a CLI SINR measurement) may satisfy the CLI threshold (for example, the CLI RSRP threshold, the CLI RSSI threshold, or the CLI SINR threshold), and thus satisfy the condition associated with L2 trigger event, when the CLI measurement is greater than the CLI threshold or greater than or equal to the CLI threshold. In other examples, the CLI measurement (for example, a CLI RSRP measurement, a CLI RSSI measurement, or a CLI SINR measurement) may satisfy the CLI threshold (for example, the CLI RSRP threshold, the CLI RSSI threshold, or the CLI SINR threshold), and thus satisfy the condition associated with the L2 event, when the CLI measurement is less than the CLI threshold or less than or equal to the CLI threshold.

In some aspects, the configuration information may configure and/or identify multiple different L2 trigger events, each associated with a respective condition for triggering L2 CLI reporting. For example, a first condition associated with a first L2 trigger event may be satisfied in connection with a CLI measurement being greater than a first CLI threshold, and a second condition associated with a second L2 trigger event may be satisfied in connection with a CLI measurement being less than a second CLI threshold. In some aspects, a condition associated with a L2 trigger event may be associated with one or more CLI thresholds (for example, one or more of a CLI RSRP threshold, a CLI RSSI threshold, or a CLI SINR threshold). In such examples, the condition may be satisfied in connection with all of the one or more CLI thresholds being satisfied, or the condition may be satisfied in connection with at least one of the one or more CLI thresholds being satisfied. In some aspects, the configuration information may indicate a respective CLI threshold associated with each of one or more L2 trigger events. For example, the one or more L2 trigger events may be associated with respective event IDs, and the configuration information may indicate the event IDs associated with the one or more L2 trigger events and a respective CLI threshold per event ID.

In some other aspects, one or more L2 trigger events and/or the conditions associated with the one or more L2 trigger events may be defined or identified in a wireless communication standard (for example, a 3GPP standard). For example, the wireless communication standard may define a respective CLI threshold associated with each of the one or more L2 trigger events. In such examples, the UE 120 may store information associated with the one or more L2 trigger events and/or the conditions associated with the one or more L2 trigger events. For example, the UE 120 may store the respective CLI threshold associated with the one or more L2 trigger events.

As further shown in FIG. 9, at a second operation 910, the UE 120 may perform a CLI measurement. The CLI measurement may be a UE-to-UE CLI measurement. The UE 120 may perform the UE-to-UE CLI measurement on a CLI resource indicated in the configuration information. For example, the UE 120 may measure one or more CLI metrics, such as CLI RSRP, CLI RSSI, and/or CLI SINR, among other examples, on the CLI resource. The UE 120 may measure the one or more CLI metrics based on or otherwise associated with a signal (for example, an uplink reference signal, such as an SRS) transmitted by another UE (for example, an aggressor UE) on the CLI resource.

In some aspects, the UE 120 may perform the UE-to-UE CLI measurement (for example, an inter-SB intra-cell UE-to-UE CLI measurement or an inter-SB inter-cell UE-to-UE CLI measurement) in a downlink sub-band or an uplink sub-band of an SBFD slot or symbol. In some aspects, the UE 120 may perform the UE-to-UE CLI measurement (for example, an intra-cell UE-to-UE CLI measurement or an inter-cell UE-to-UE CLI measurement) in a fully overlapping IBFD slot or symbol or a partial overlapping IBFD slot or symbol. In some aspects, the UE 120 may perform the UE-to-UE CLI measurement (for example, an inter-cell UE-to-UE CLI measurement) in a downlink dynamic TDD slot or symbol.

As further shown in FIG. 9, in a third operation 915, the UE 120 may detect that a condition associated with an L2 trigger event is satisfied. The UE 120 may detect whether the condition associated with the L2 trigger event is satisfied based on or otherwise associated with the UE-to-UE CLI measurement performed by the UE 120. In some aspects, the UE 120 may detect that the condition associated with the L2 trigger event is satisfied in connection with the UE-to-UE CLI measurement satisfying the CLI threshold associated with the L2 trigger event. For example, the CLI threshold may correspond to a CLI metric, and the UE 120 may compare a value for the CLI metric measured by the UE 120 to the CLI threshold to determine whether the UE-to-UE CLI measurement satisfies the CLI metric. In some examples, the UE 120 may detect that the condition associated with the L2 trigger event is satisfied in connection with a determination that a measured CLI RSRP value satisfies a CLI RSRP threshold. In some examples, the UE 120 may detect that the condition associated with the L2 trigger event is satisfied in connection with a determination that a measured CLI RSSI value satisfies a CLI RSSI threshold. In some examples, the detect that the condition associated with the L2 trigger event is satisfied in connection with a determination that a measured CLI SINR value satisfies a CLI SINR threshold.

In some examples, the UE 120 may detect that the condition associated with the L2 trigger event is satisfied in connection with a determination that the UE-to-UE CLI measurement satisfies at least one CLI threshold, of multiple CLI thresholds associated with the L2 trigger event. In some examples, the UE 120 may detect that the condition associated with the L2 trigger event is satisfied in connection with a determination that the UE-to-UE CLI measurement satisfies each CLI threshold, of multiple CLI thresholds associated with the L2 trigger event.

As further shown in FIG. 9, in a fourth operation 920, the UE 120 may transmit, and the network node 110 may receive, an L2 CLI report in connection with the condition associated with the L2 trigger event being satisfied. For example, transmission of the L2 CLI report, by the UE 120, may be triggered by the condition associated with the L2 trigger event being satisfied (for example, the CLI measurement satisfying the CLI threshold associated with the L2 trigger event). That is, the UE 120 may transmit the L2 CLI report responsive to, based on, or otherwise associated with detecting that the condition associated with the L2 trigger event is satisfied. The L2 CLI report may indicate one or more CLI metrics associated with the UE-to-UE CLI measurement performed by the UE 120.

In some aspects, the UE 120 may transmit the L2 CLI report in an uplink MAC-CE transmitted via uplink resources (for example, PUSCH resources) granted to the UE 120. For example, the UE 120 may transmit the L2 CLI report in an uplink MAC-CE associated with L2 CLI reporting in connection with an L2 trigger event. In such examples, the uplink MAC-CE may be an uplink MAC-CE defined in a wireless communication standard (for example, a 3GPP standard) for carrying an event-triggered L2 CLI report. In some aspects, the UE 120 may transmit the uplink MAC-CE including the L2 CLI report in an existing uplink grant of PUSCH resources. For example, the UE 120 may transmit the uplink MAC-CE including the L2 CLI report in one or more PUSCH resources granted via a previous dynamic uplink grant received from the network node 110, or the UE 120 may transmit the uplink MAC-CE including the L2 CLI report in periodically occurring PUSCH resources associated with a configured grant that has been configured and activated for the UE 120. In some other aspects, the UE 120 may transmit, and the network node 110 may receive, an SR requesting an uplink grant in connection with the condition associated with the L2 trigger event being satisfied. The network node 110 may then transmit, and the UE 120 may receive, an uplink grant in connection with the SR. The UE 120 may then transmit the uplink MAC-CE in the uplink resources (for example, PUSCH resources) granted in the uplink grant.

In some aspects, the UE 120 may activate multiple uplink MAC-CEs in connection with the condition associated with the L2 trigger event being satisfied. That is, the UE 120 may transmit multiple MAC-CEs, each including a respective L2 measurement report, in connection with the condition associated with the L2 trigger event being satisfied. In some examples, the UE 120 may transmit the multiple uplink MAC-CEs in respective periodic uplink resources associated with a configured grant. In some other examples, the UE 120 may transmit the multiple uplink MAC-CEs separated by a report interval in existing granted PUSCH resources or in PUSCH resources granted in connection with the UE 120 transmitting an SR to the network node 110. The report interval may be a time interval (for example, 5 ms) between consecutive transmissions of the uplink MAC-CEs including the respective L2 CLI reports. The respective L2 CLI report included in each uplink MAC-CE may be associated with at least one respective UE-to-UE CLI measurement performed by the UE 120. For example, multiple L2 CLI reports, each indicating CLI metrics associated to with one or more respective CLI measurements, may be triggered by the same L2 trigger event. The UE 120 may continue performing CLI measurements after detecting that the condition associated with the L2 trigger event is satisfied, and the UE 120 may transmit the multiple uplink MAC-CEs including the respective L2 CLI reports to provide, to the network node 110, CLI measurements associated with a CLI trend. In some aspects, once the UE 120 detects that the condition associated with the L2 trigger event is satisfied, the UE 120 may transmit uplink MAC-CEs (for example, separated by the report interval) including respective L2 CLI reports for a certain time duration, until a certain number of MAC-CEs are transmitted by the UE 120, or until the UE 120 detects a stopping condition (for example, a stopping condition based on or otherwise associated with a CLI measurement).

In some aspects, the event-triggered L2 CLI report may include assistance information associated with the UE-to-UE CLI measurement performed by the UE 120, such as a delta timing associated the UE-to-UE CLI measurement and/or a suggested power backoff for an aggressor UE associated with the UE-to-UE CLI measurement, as discussed in connection with FIG. 10.

As further shown in FIG. 9, in a fifth operation 925, the network node 110 may perform CLI mitigation. For example, the network node 110 may apply a CLI mitigation mechanism to reduce UE-to-UE CLI on one or more downlink communications scheduled for the UE 120. The network node 110 may perform CLI mitigation responsive to, based on, or otherwise associated with the L2 CLI report (or multiple L2 CLI reports) received from the UE 120. For example, the network node 110 may perform CLI mitigation responsive to, based on, or otherwise associated with one or more CLI metrics included in the L2 CLI report and/or a CLI trend associated with CLI metrics included in multiple L2 CLI reports. In some aspects, the network node 110 may perform beam switching to switch a downlink beam associated with a downlink communication with respect to a downlink beam associated with the UE 120 and/or an uplink beam associated with an aggressor UE to reduce UE-to-UE CLI on a downlink communication to be transmitted by the UE 120. In some aspects, the network node 110 may mitigate UE-to-UE CLI on a scheduled downlink communication for the UE 120 by switching a UE scheduled for uplink communications simultaneous to (or overlapping with) downlink communications scheduled for the UE 120. In some aspects, the network node 110 may perform CLI mitigation by causing an aggressor UE to reduce a transmit power of uplink communications transmitted by the aggressor UE.

Figure 10:
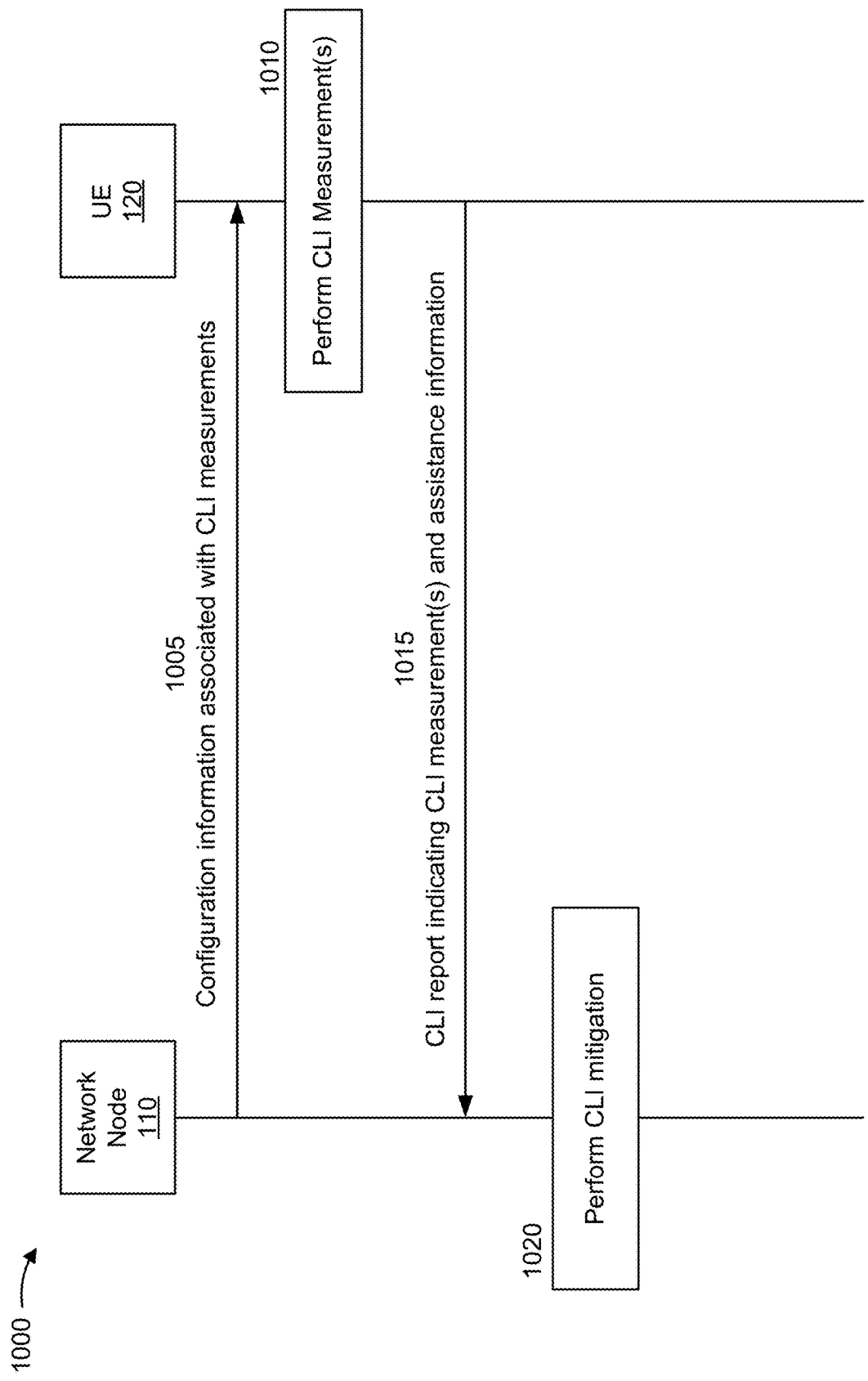
FIG. 10 is a diagram illustrating an example associated with CLI reporting with assistance information, in accordance with the present disclosure.

FIG. 10 is a diagram illustrating an example 1000 associated with CLI reporting with assistance information, in accordance with the present disclosure. As shown in FIG. 10, example 1000 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 10, in a first operation 1005, the network node 110 may transmit, and the UE 120 may receive, configuration information associated with CLI measurements. For example, the configuration may be included in one or more RRC messages, one or more MAC-CEs, or DCI. In some aspects, the configuration information may indicate one or more CLI resources on which respective CLI measurements are to be performed by the UE 120. For example, the CLI resources may be time and frequency resources on which the UE 120 is to perform UE-to-UE CLI measurements. In such examples, the UE 120 may be a victim UE configured to measure, on the CLI resources, UE-to-UE CLI at the UE 120 caused by one or more aggressor UEs. In some aspects, the network node 110 may transmit, to the one or more aggressor UEs, configuration information that configures the one or more aggressor UEs to transmit a signal (for example, an uplink reference signal, such as an SRS) on the one or more CLI resources to be measured by the UE 120. In some aspects, the configuration information may configured one or more periodic CLI measurement resources, one or more semi-persistent CLI measurement resources, and/or one or more aperiodic CLI measurement resources.

In some aspects, the configuration information may configure the UE 120 with a CLI resource, on which a UE-to-UE CLI measurement is to be performed, in at least one of a downlink sub-band or an uplink sub-band of an SBFD slot or symbol. In such examples, the UE-to-UE CLI measurement to be performed by the UE 120 may be a measurement of inter-SB intra-cell UE-to-UE CLI or a measurement of inter-SB inter-cell UE-to-UE CLI. Additionally or alternatively, the configuration information may configure the UE 120 with a CLI resource, on which a UE-to-UE CLI measurement is to be performed, in at least one of a fully overlapping IBFD slot or symbol or a partial overlapping IBFD slot or symbol. In such examples, the UE-to-UE CLI measurement to be performed by the UE 120 may be an intra-cell UE-to-UE CLI measurement or an inter-cell UE-to-UE CLI measurement. Additionally or alternatively, the configuration information may configure the UE 120 with a CLI resource, on which a UE-to-UE CLI measurement is to be performed in a dynamic TDD slot or symbol (for example, in a downlink dynamic TDD slot or symbol). In such examples, the UE-to-UE CLI measurement to be performed by the UE 120 may be an inter-cell UE-to-UE CLI measurement.

As further shown in FIG. 10, in a second operation 1010, the UE 120 may perform a CLI measurement. The CLI measurement may be a UE-to-UE CLI measurement. The UE 120 may perform the UE-to-UE CLI measurement on a CLI resource indicated in the configuration information. For example, the UE 120 may measure one or more CLI metrics, such as CLI RSRP, CLI RSSI, and/or CLI SINR, among other examples, on the CLI resource. The UE 120 may measure the one or more CLI metrics based on or otherwise associated with a signal (for example, an uplink reference signal, such as an SRS) transmitted by another UE (for example, an aggressor UE) on the CLI resource.

In some aspects, the UE 120 may perform the UE-to-UE CLI measurement (for example, an inter-SB intra-cell UE-to-UE CLI measurement or an inter-SB inter-cell UE-to-UE CLI measurement) in a downlink sub-band or an uplink sub-band of an SBFD slot or symbol. In some aspects, the UE 120 may perform the UE-to-UE CLI measurement (for example, an intra-cell UE-to-UE CLI measurement or an inter-cell UE-to-UE CLI measurement) in a fully overlapping IBFD slot or symbol or a partial overlapping IBFD slot or symbol. In some aspects, the UE 120 may perform the UE-to-UE CLI measurement (for example, an inter-cell UE-to-UE CLI measurement) in a downlink dynamic TDD slot or symbol.

In some aspects, the UE 120 may perform one or more CLI measurements. In some examples, the UE 120 may perform multiple periodic or semi-persistent CLI measurements (for example, UE-to-UE CLI measurement), and the UE 120 may report the multiple periodic or semipersistent CLI measurements in a same CLI report.

As further shown in FIG. 10, in a third operation 1015, the UE 120 may transmit, and the network node 110 may receive, a CLI report that indicates the CLI measurement (or multiple CLI measurements) and assistance information associated with the CLI measurement (or the multiple CLI measurements). In some aspects, the CLI report may indicate one or more CLI metrics (for example, CLI RSRP, CLI RSSI, and/or CLI SINR, among other examples) associated with the one or more CLI measurements. The assistance information may include additional information, other than the CLI measurement values (for example, the CLI metrics), that relates to, is based on, or is otherwise associated with the one or more CLI measurements. For example, the assistance information may include information, other than the CLI measurement values, for assisting the network node 110 with CLI mitigation. In some examples, one or more new reportQuantity parameters may be defined to report different types of assistance information in the CLI report. In some aspects, the assistance information may indicate at least one of a delta timing associated with the one or more UE-to-UE CLI measurements or a power backoff for an aggressor UE associated with the one or more UE-to-UE CLI measurements. The delta timing between a downlink timing for the UE 120 and an uplink timing for an aggressor UE associated with a UE-to-UE CLI measurement performed on a CLI resource. The delta timing may assist the network node 110 configuring more accurate CLI measurements and/or with more accurate UE-to-UE CLI mitigation by the network node 110. The power backoff indicated in the assistance information may be a power backoff for the aggressor UE suggested, recommended, or requested by the UE 120 that performed the UE-to-UE measurement on a CLI resource. For example, the UE 120 may determine, based on or otherwise associated with the CLI measurement on a CLI resource, a suggested power backoff for the aggressor UE 120 that will result in reduce UE-to-UE CLI on downlink reception by the UE 120. The assistance information may indicate the suggested power backoff to the network node 110, to assist the network node 110 in mitigating UE-to-UE CLI between the aggressor UE and the UE 120.

The CLI report including the assistance information may be an L1 CLI report, an L2 CLI report, or an L3 CLI report. In some aspects, the CLI report may be an event-triggered CLI report, such as an event-triggered Li CLI report discussed above in connection with FIGS. 8A-8B, an event-triggered L2 CLI report discussed above in connection with FIG. 9, or an event-triggered L3 CLI report. In some other aspects, the CLI report may be a periodic CLI report, a semi-persistent CLI report, or an aperiodic CLI report.

As further shown in FIG. 10, in a fourth operation 1020, the network node 110 may perform CLI mitigation. For example, the network node 110 may apply a CLI mitigation mechanism to reduce UE-to-UE CLI on one or more downlink communications scheduled for the UE 120. The network node 110 may perform CLI mitigation responsive to, based on, or otherwise associated with the CLI report received from the UE 120. For example, the network node 110 may perform CLI mitigation responsive to, based on, or otherwise associated with one or more CLI measurements (for example, including one or more CLI metrics) indicated in the CLI report and/or the assistance information indicated in the CLI report. In some examples, the network node 110 may perform CLI mitigation responsive to, based on, or otherwise associated with the delta timing and/or the suggested power backoff for the aggressor UE indicated in the assistance information. In some aspects, the network node 110 may perform beam switching to switch a downlink beam associated with a downlink communication with respect to a downlink beam associated with the UE 120 and/or an uplink beam associated with an aggressor UE to reduce UE-to-UE CLI on a downlink communication to be transmitted by the UE 120. In some aspects, the network node 110 may mitigate UE-to-UE CLI on a scheduled downlink communication for the UE 120 by switching a UE scheduled for uplink communications simultaneous to (or overlapping with) downlink communications scheduled for the UE 120. In some aspects, the network node 110 may perform CLI mitigation by causing an aggressor UE to reduce a transmit power of uplink communications transmitted by the aggressor UE. For example, the network node 110 may determine a reduction to be applied to the transmit power of the aggressor UE based on or otherwise associated with the suggested power backoff indicated in the assistance information.

Figure 11:
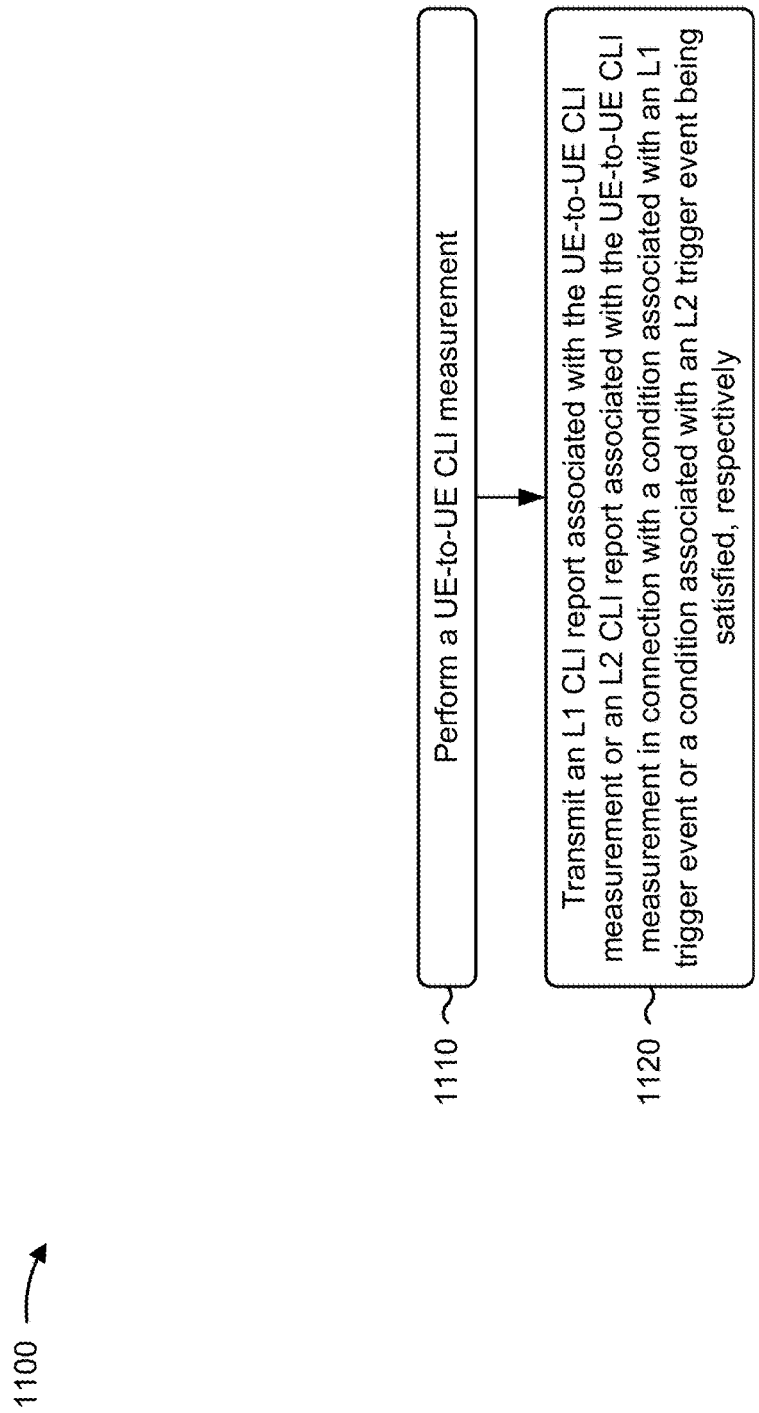
FIG. 11 is a flowchart illustrating an example process performed, for example, by a UE that supports event-trigger L1 or L2 CLI reporting in accordance with the present disclosure.

FIG. 11 is a flowchart illustrating an example process 1100 performed, for example, by a UE that supports event-trigger L1 or L2 CLI reporting in accordance with the present disclosure. Example process 1100 is an example where the UE (for example, UE 120) performs operations associated with event-triggered L1 or L2 CLI reporting.

As shown in FIG. 11, in some aspects, process 1100 may include performing a UE-to-UE CLI measurement (block 1110). For example, the UE (such as by using communication manager 140 or CLI measurement component 1508, depicted in FIG. 15) may perform a UE-to-UE CLI measurement, as described above.

As further shown in FIG. 11, in some aspects, process 1100 may include transmitting an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively (block 1120). For example, the UE (such as by using communication manager 140 or transmission component 1504, depicted in FIG. 15) may transmit an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively, as described above.

Process 1100 may include additional aspects, such as any single aspect or any combination of aspects described below or in connection with one or more other processes described elsewhere herein.

In a first additional aspect, transmitting the Li CLI report associated with the UE-to-UE CLI measurement or the L2 CLI report associated with the UE-to-UE CLI measurement includes transmitting the L1 CLI report associated with the UE-to-UE CLI measurement in connection with the condition associated with the L1 trigger event being satisfied.

In a second additional aspect, alone or in combination with the first aspect, the condition associated with the L1 trigger event is satisfied in connection with the UE-to-UE CLI measurement satisfying a CLI threshold associated with the Li trigger event.

In a third additional aspect, alone or in combination with one or more of the first and second aspects, performing the UE-to-UE CLI measurement includes measuring at least one of a CLI RSRP value, a CLI RSSI value, or a CLI SINR value, and the UE-to-UE CLI measurement satisfies the CLI threshold in connection with at least one of the CLI RSRP value satisfying a CLI RSRP threshold, the CLI RSSI value satisfying a CLI RSSI threshold, or the CLI SINR value satisfying a CLI SINR threshold.

In a fourth additional aspect, alone or in combination with one or more of the first through third aspects, process 1100 includes receiving configuration information indicating the CLI threshold associated with the Li trigger event.

In a fifth additional aspect, alone or in combination with one or more of the first through fourth aspects, the configuration information indicates a plurality of CLI thresholds associated with respective L1 trigger events, the plurality of CLI thresholds including the CLI threshold associated with the L1 trigger event.

In a sixth additional aspect, alone or in combination with one or more of the first through fifth aspects, transmitting the L1 CLI report associated with the UE-to-UE CLI measurement includes transmitting the L1 CLI report on one or more periodic uplink resources reserved for L1 CLI reporting in connection with the L1 trigger event.

In a seventh additional aspect, alone or in combination with one or more of the first through sixth aspects, process 1100 includes receiving an information element associated with event-triggered L1 CLI reporting, the information element including configuration information indicating the one or more periodic uplink resources.

In an eighth additional aspect, alone or in combination with one or more of the first through seventh aspects, the one or more periodic uplink resources include one or more periodic PUCCH resources or one or more periodic PUSCH resources.

In a ninth additional aspect, alone or in combination with one or more of the first through eighth aspects, process 1100 includes receiving an information element including configuration information indicating a CLI resource on which the CLI measurement is to be performed, wherein performing the UE-to-UE CLI measurement includes performing the UE-to-UE CLI measurement on the CLI resource.

In a tenth additional aspect, alone or in combination with one or more of the first through ninth aspects, the configuration information indicates a periodicity and an offset for the CLI resource.

In an eleventh additional aspect, alone or in combination with one or more of the first through tenth aspects, process 1100 includes receiving an information element including configuration information indicating one or more event identifiers associated with one or more L1 trigger events, each associated with at least one respective CLI threshold, wherein the one or more L1 trigger events include the L1 trigger event, and wherein the condition associated with the L1 trigger event is satisfied in connection with the UE-to-UE CLI measurement satisfying the at least one respective CLI threshold associated with the L1 trigger event.

In a twelfth additional aspect, alone or in combination with one or more of the first through eleventh aspects, the at least one respective CLI threshold associated with each L1 trigger event, of the one or more L1 trigger events, is identified in another information element.

In a thirteenth additional aspect, alone or in combination with one or more of the first through twelfth aspects, the configuration information further indicates the at least one CLI threshold associated with each Li trigger event, of the one or more L1 trigger events.

In a fourteenth additional aspect, alone or in combination with one or more of the first through thirteenth aspects, process 1100 includes receiving an information element including configuration information indicating a physical priority index for the L1 CLI report.

In a fifteenth additional aspect, alone or in combination with one or more of the first through fourteenth aspects, the condition associated with the Li trigger event is satisfied in connection with the UE-to-UE CLI measurement satisfying a CLI threshold associated with the L1 trigger event, and the Li CLI report includes an indication that the UE-to-UE CLI measurement satisfies the CLI threshold.

In a sixteenth additional aspect, alone or in combination with one or more of the first through fifteenth aspects, the L1 CLI report includes an indication of one or more CLI metrics associated with the UE-to-UE CLI measurement.

In a seventeenth additional aspect, alone or in combination with one or more of the first through sixteenth aspects, process 1100 includes transmitting a scheduling request including an indication that the condition associated with the L1 trigger event is satisfied, and receiving an uplink grant in connection with the scheduling request, wherein the L1 CLI report is transmitted in association with receiving the uplink grant.

In an eighteenth additional aspect, alone or in combination with one or more of the first through seventeenth aspects, the scheduling request is associated with a scheduling request identifier associated with event triggered L1 CLI reporting.

In a nineteenth additional aspect, alone or in combination with one or more of the first through eighteenth aspects, transmitting the L1 CLI report associated with the UE-to-UE CLI measurement includes transmitting the L1 CLI report in a scheduling request.

In a twentieth additional aspect, alone or in combination with one or more of the first through nineteenth aspects, transmitting the L1 CLI report associated with the UE-to-UE CLI measurement includes transmitting the L1 CLI report in a RACH resource.

In a twenty-first additional aspect, alone or in combination with one or more of the first through twentieth aspects, the RACH resource is an RO associated with CFRA.

In a twenty-second additional aspect, alone or in combination with one or more of the first through twenty-first aspects, the L1 CLI report includes an indication that the condition associated with the L1 trigger event is satisfied.

In a twenty-third additional aspect, alone or in combination with one or more of the first through twenty-second aspects, the L1 CLI report includes an indication of one or more CLI metrics associated with the UE-to-UE CLI measurement.

In a twenty-fourth additional aspect, alone or in combination with one or more of the first through twenty-third aspects, the one or more CLI metrics include one or more of a CLI RSRP, a CLI RSSI, or a CLI SINR.

In a twenty-fifth additional aspect, alone or in combination with one or more of the first through twenty-fourth aspects, transmitting the L1 CLI report associated with the UE-to-UE CLI measurement or the L2 CLI report associated with the UE-to-UE CLI measurement includes transmitting the L2 CLI report associated with the UE-to-UE CLI measurement in connection with the condition associated with the L2 trigger event being satisfied.

In a twenty-sixth additional aspect, alone or in combination with one or more of the first through twenty-fifth aspects, the condition associated with the L2 trigger event is satisfied in connection with the UE-to-UE CLI measurement satisfying a CLI threshold associated with the L2 trigger event.

In a twenty-seventh additional aspect, alone or in combination with one or more of the first through twenty-sixth aspects, the L2 trigger event is one of multiple L2 trigger events, each associated with a respective CLI threshold.

In a twenty-eighth additional aspect, alone or in combination with one or more of the first through twenty-seventh aspects, transmitting the L2 CLI report associated with the UE-to-UE CLI measurement includes transmitting the L2 CLI report in an uplink MAC-CE associated with L2 CLI reporting in connection with the L2 trigger event.

In a twenty-ninth additional aspect, alone or in combination with one or more of the first through twenty-eighth aspects, transmitting the L2 CLI report associated with the UE-to-UE CLI measurement includes transmitting multiple MAC-CEs, each including a respective L2 CLI report associated with at least one respective UE-to-UE CLI measurement, in connection with the condition associated with the L2 trigger event being satisfied.

In a thirtieth additional aspect, alone or in combination with one or more of the first through twenty-ninth aspects, the Li CLI report or the L2 CLI report includes assistance information associated with the UE-to-UE CLI measurement.

In a thirty-first additional aspect, alone or in combination with one or more of the first through thirtieth aspects, the assistance information indicates at least one of a delta timing associated with the UE-to-UE CLI measurement or a power backoff for an aggressor UE associated with the UE-to-UE CLI measurement.

In a thirty-second additional aspect, alone or in combination with one or more of the first through thirty-first aspects, performing the UE-to-UE CLI measurement includes performing the UE-to-UE CLI measurement in at least one of a downlink sub-band or an uplink sub-band of an SBFD slot or symbol.

In a thirty-third additional aspect, alone or in combination with one or more of the first through thirty-second aspects, performing the UE-to-UE CLI measurement includes performing the UE-to-UE CLI measurement in a downlink dynamic TDD slot or symbol, a partial overlapping in-band full duplex slot or symbol, or a fully overlapping in-band full duplex slot or symbol.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
FIG. 12 is a flowchart illustrating an example process performed, for example, by a network node that supports event-triggered L1 or L2 CLI reporting in accordance with the present disclosure.

FIG. 12 is a flowchart illustrating an example process 1200 performed, for example, by a network node that supports event-triggered L1 or L2 CLI reporting in accordance with the present disclosure. Example process 1200 is an example where the network node (for example, network node 110) performs operations associated with event-triggered L1 or L2 CLI reporting.

As shown in FIG. 12, in some aspects, process 1200 may include transmitting, to a UE, an indication of a CLI resource associated with a UE-to-UE CLI measurement to be performed by the UE (block 1210). For example, the network node (such as by using communication manager 150 or transmission component 1604, depicted in FIG. 16) may transmit, to a UE, an indication of a CLI resource associated with a UE-to-UE CLI measurement to be performed by the UE, as described above.

As further shown in FIG. 12, in some aspects, process 1200 may include receiving, from the UE, an Li CLI report associated with the UE-to-UE CLI measurement or an L2 CLI report associated with the UE-to-UE CLI measurement in connection with a condition associated with an L1 trigger event or a condition associated with an L2 trigger event being satisfied, respectively (block 1220). For example, the network node (such as by using communication manager 150 or reception component 1602, depicted in FIG. 16) may receive, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively, as described above.

Process 1200 may include additional aspects, such as any single aspect or any combination of aspects described below or in connection with one or more other processes described elsewhere herein.

In a first additional aspect, receiving the L1 CLI report associated with the UE-to-UE CLI measurement or the L2 CLI report associated with the UE-to-UE CLI measurement includes receiving the Li CLI report associated with the UE-to-UE CLI measurement in connection with the condition associated with the L1 trigger event being satisfied.

In a second additional aspect, alone or in combination with the first aspect, the condition associated with the L1 trigger event is satisfied in connection with the UE-to-UE CLI measurement satisfying a CLI threshold associated with the Li trigger event.

In a third additional aspect, alone or in combination with one or more of the first and second aspects, the UE-to-UE CLI measurement includes at least one of a CLI RSRP value, a CLI RSSI value, or a CLI SINR value, and the UE-to-UE CLI measurement satisfies the CLI threshold in connection with at least one of the CLI RSRP value satisfying a CLI RSRP threshold, the CLI RSSI value satisfying a CLI RSSI threshold, or the CLI SINR value satisfying a CLI SINR threshold.

In a fourth additional aspect, alone or in combination with one or more of the first through third aspects, process 1200 includes transmitting configuration information indicating the CLI threshold associated with the Li trigger event.

In a fifth additional aspect, alone or in combination with one or more of the first through fourth aspects, the configuration information indicates a plurality of CLI thresholds associated with respective L1 trigger events, the plurality of CLI thresholds including the CLI threshold associated with the L1 trigger event.

In a sixth additional aspect, alone or in combination with one or more of the first through fifth aspects, receiving the L1 CLI report associated with the UE-to-UE CLI measurement includes receiving the L1 CLI report on one or more periodic uplink resources reserved for L1 CLI reporting in connection with the Li trigger event.

In a seventh additional aspect, alone or in combination with one or more of the first through sixth aspects, process 1200 includes transmitting an information element associated with event-triggered L1 CLI reporting, the information element including configuration information indicating the one or more periodic uplink resources.

In an eighth additional aspect, alone or in combination with one or more of the first through seventh aspects, the one or more periodic uplink resources include one or more periodic PUCCH resources or one or more periodic PUSCH resources.

In a ninth additional aspect, alone or in combination with one or more of the first through eighth aspects, process 1200 includes transmitting an information element including configuration information indicating the indication of the CLI resource.

In a tenth additional aspect, alone or in combination with one or more of the first through ninth aspects, the configuration information indicates a periodicity and an offset for the CLI resource.

In an eleventh additional aspect, alone or in combination with one or more of the first through tenth aspects, process 1200 includes transmitting an information element including configuration information indicating one or more event identifiers associated with one or more L1 trigger events, each associated with at least one respective CLI threshold, wherein the one or more L1 trigger events include the L1 trigger event, and wherein the condition associated with the L1 trigger event is satisfied in connection with the UE-to-UE CLI measurement satisfying the at least one respective CLI threshold associated with the L1 trigger event.

In a twelfth additional aspect, alone or in combination with one or more of the first through eleventh aspects, the at least one respective CLI threshold associated with each L1 trigger event, of the one or more L1 trigger events, is identified in another information element transmitted by the network node.

In a thirteenth additional aspect, alone or in combination with one or more of the first through twelfth aspects, the configuration information further indicates the at least one CLI threshold associated with each Li trigger event, of the one or more L1 trigger events.

In a fourteenth additional aspect, alone or in combination with one or more of the first through thirteenth aspects, process 1200 includes transmitting an information element including configuration information indicating a physical priority index for the L1 CLI report.

In a fifteenth additional aspect, alone or in combination with one or more of the first through fourteenth aspects, the condition associated with the Li trigger event is satisfied in connection with the UE-to-UE CLI measurement satisfying a CLI threshold associated with the L1 trigger event, and the Li CLI report includes an indication that the UE-to-UE CLI measurement satisfies the CLI threshold.

In a sixteenth additional aspect, alone or in combination with one or more of the first through fifteenth aspects, the L1 CLI report includes an indication of one or more CLI metrics associated with the UE-to-UE CLI measurement.

In a seventeenth additional aspect, alone or in combination with one or more of the first through sixteenth aspects, process 1200 includes receiving a scheduling request including an indication that the condition associated with the L1 trigger event is satisfied, and transmitting an uplink grant in connection with the scheduling request, wherein the L1 CLI report is received in connection with transmitting the uplink grant.

In an eighteenth additional aspect, alone or in combination with one or more of the first through seventeenth aspects, the scheduling request is associated with a scheduling request identifier associated with event triggered L1 CLI reporting.

In a nineteenth additional aspect, alone or in combination with one or more of the first through eighteenth aspects, receiving the L1 CLI report associated with the UE-to-UE CLI measurement includes receiving the L1 CLI report in a scheduling request.

In a twentieth additional aspect, alone or in combination with one or more of the first through nineteenth aspects, receiving the L1 CLI report associated with the UE-to-UE CLI measurement includes receiving the L1 CLI report in a RACH resource.

In a twenty-first additional aspect, alone or in combination with one or more of the first through twentieth aspects, the RACH resource is an RO associated with CFRA.

In a twenty-second additional aspect, alone or in combination with one or more of the first through twenty-first aspects, the L1 CLI report includes an indication that the condition associated with the L1 trigger event is satisfied.

In a twenty-third additional aspect, alone or in combination with one or more of the first through twenty-second aspects, the L1 CLI report includes an indication of one or more CLI metrics associated with the UE-to-UE CLI measurement.

In a twenty-fourth additional aspect, alone or in combination with one or more of the first through twenty-third aspects, the one or more CLI metrics include one or more of a CLI RSRP, a CLI RSSI, or a CLI SINR.

In a twenty-fifth additional aspect, alone or in combination with one or more of the first through twenty-fourth aspects, receiving the L1 CLI report associated with the UE-to-UE CLI measurement or the L2 CLI report associated with the UE-to-UE CLI measurement includes receiving the L2 CLI report associated with the UE-to-UE CLI measurement in connection with the condition associated with the L2 trigger event being satisfied.

In a twenty-sixth additional aspect, alone or in combination with one or more of the first through twenty-fifth aspects, the condition associated with the L2 trigger event is satisfied in connection with the UE-to-UE CLI measurement satisfying a CLI threshold associated with the L2 trigger event.

In a twenty-seventh additional aspect, alone or in combination with one or more of the first through twenty-sixth aspects, the L2 trigger event is one of multiple L2 trigger events, each associated with a respective CLI threshold.

In a twenty-eighth additional aspect, alone or in combination with one or more of the first through twenty-seventh aspects, receiving the L2 CLI report associated with the UE-to-UE CLI measurement includes receiving the L2 CLI report in an uplink MAC-CE associated with L2 CLI reporting in connection with the L2 trigger event.

In a twenty-ninth additional aspect, alone or in combination with one or more of the first through twenty-eighth aspects, receiving the L2 CLI report associated with the UE-to-UE CLI measurement includes receiving multiple MAC-CEs, each including a respective L2 CLI report associated with at least one respective UE-to-UE CLI measurement, in connection with the condition associated with the L2 trigger event being satisfied.

In a thirtieth additional aspect, alone or in combination with one or more of the first through twenty-ninth aspects, the L1 CLI report or the L2 CLI report includes assistance information associated with the UE-to-UE CLI measurement.

In a thirty-first additional aspect, alone or in combination with one or more of the first through thirtieth aspects, the assistance information indicates at least one of a delta timing associated with the UE-to-UE CLI measurement or a power backoff for an aggressor UE associated with the UE-to-UE CLI measurement.

In a thirty-second additional aspect, alone or in combination with one or more of the first through thirty-first aspects, the CLI resource is in at least one of a downlink sub-band of an SBFD slot or symbol, an uplink sub-band of an SBFD slot or symbol, a downlink TDD slot or symbol, a partial overlapping in-band full duplex slot or symbol, or a fully overlapping in-band full duplex slot or symbol.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
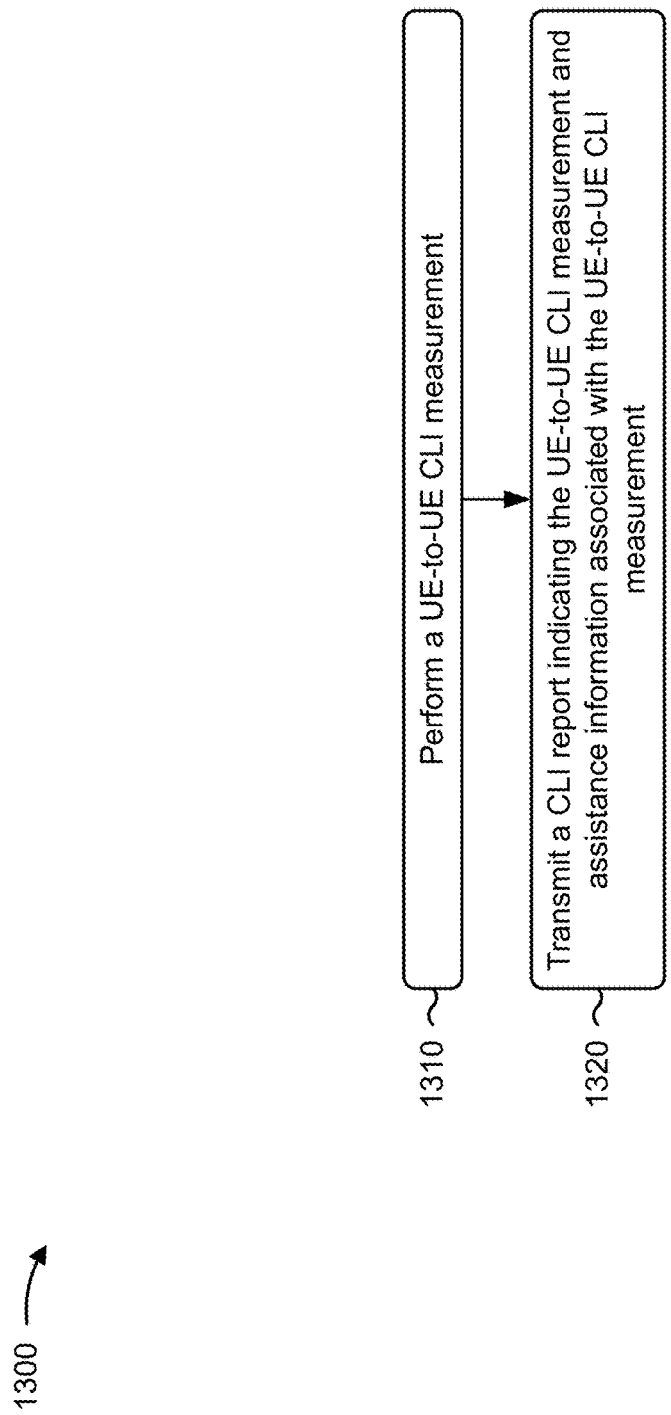
FIG. 13 is a flowchart illustrating an example process performed, for example, by a UE that supports CLI reporting with assistance information in accordance with the present disclosure.

FIG. 13 is a flowchart illustrating an example process 1300 performed, for example, by a UE that supports CLI reporting with assistance information in accordance with the present disclosure. Example process 1300 is an example where the UE (for example, UE 120) performs operations associated with CLI reporting with assistance information.

As shown in FIG. 13, in some aspects, process 1300 may include performing a UE-to-UE CLI measurement (block 1310). For example, the UE (such as by using communication manager 140 or CLI measurement component 1708, depicted in FIG. 17) may perform a UE-to-UE CLI measurement, as described above.

As further shown in FIG. 13, in some aspects, process 1300 may include transmitting a CLI report indicating the UE-to-UE CLI measurement and assistance information associated with the UE-to-UE CLI measurement (block 1320). For example, the UE (such as by using communication manager 140 or transmission component 1704, depicted in FIG. 17) may transmit a CLI report indicating the UE-to-UE CLI measurement and assistance information associated with the UE-to-UE CLI measurement, as described above.

Process 1300 may include additional aspects, such as any single aspect or any combination of aspects described below or in connection with one or more other processes described elsewhere herein.

In a first additional aspect, the assistance information indicates at least one of a delta timing associated with the UE-to-UE CLI measurement or a power backoff for an aggressor UE associated with the UE-to-UE CLI measurement.

In a second additional aspect, alone or in combination with the first aspect, the CLI report is an event triggered CLI report.

In a third additional aspect, alone or in combination with one or more of the first and second aspects, the CLI report is an L1 CLI report, an L2 CLI report, or an L3 CLI report.

In a fourth additional aspect, alone or in combination with one or more of the first through third aspects, the CLI report is a periodic CLI report, a semi-persistent CLI report, or an aperiodic CLI report.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Figure 14:
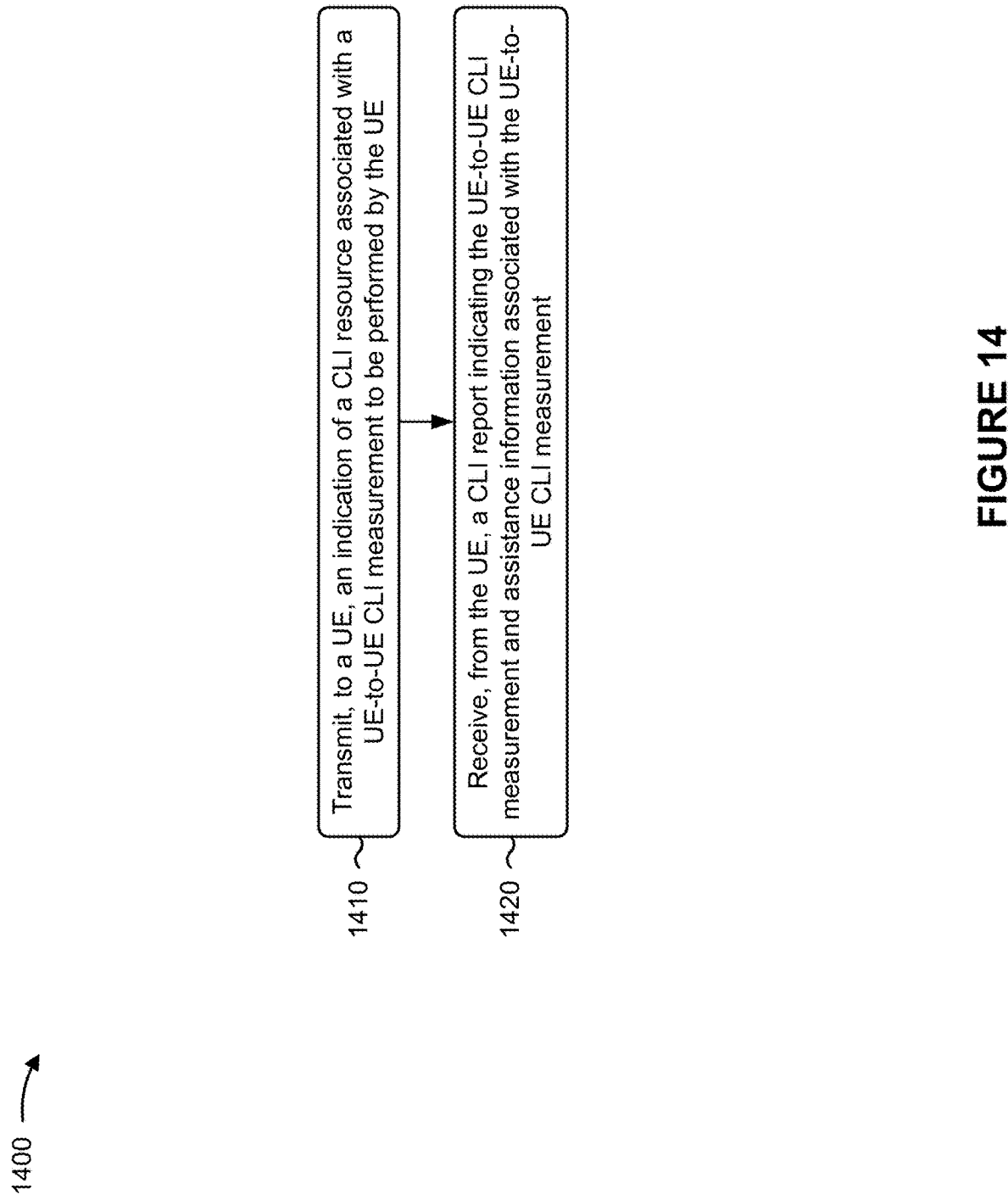
FIG. 14 is a flowchart illustrating an example process performed, for example, by a network node that supports CLI reporting with assistance information in accordance with the present disclosure.

FIG. 14 is a flowchart illustrating an example process 1400 performed, for example, by a network node that supports CLI reporting with assistance information in accordance with the present disclosure. Example process 1400 is an example where the network node (for example, network node 110) performs operations associated with CLI reporting with assistance information.

As shown in FIG. 14, in some aspects, process 1400 may include transmitting, to a UE, an indication of a CLI resource associated with a UE-to-UE CLI measurement to be performed by the UE (block 1410). For example, the network node (such as by using communication manager 150 or transmission component 1804, depicted in FIG. 18) may transmit, to a UE, an indication of a CLI resource associated with a UE-to-UE CLI measurement to be performed by the UE, as described above.

As further shown in FIG. 14, in some aspects, process 1400 may include receiving, from the UE, a CLI report indicating the UE-to-UE CLI measurement and assistance information associated with the UE-to-UE CLI measurement (block 1420). For example, the network node (such as by using communication manager 150 or reception component 1802, depicted in FIG. 18) may receive, from the UE, a CLI report indicating the UE-to-UE CLI measurement and assistance information associated with the UE-to-UE CLI measurement, as described above.

Process 1400 may include additional aspects, such as any single aspect or any combination of aspects described below or in connection with one or more other processes described elsewhere herein.

In a first additional aspect, the assistance information indicates at least one of a delta timing associated with the UE-to-UE CLI measurement or a power backoff for an aggressor UE associated with the UE-to-UE CLI measurement.

In a second additional aspect, alone or in combination with the first aspect, the CLI report is an event triggered CLI report.

In a third additional aspect, alone or in combination with one or more of the first and second aspects, the CLI report is an L1 CLI report, an L2 CLI report, or an L3 CLI report.

In a fourth additional aspect, alone or in combination with one or more of the first through third aspects, the CLI report is a periodic CLI report, a semi-persistent CLI report, or an aperiodic CLI report.

Although FIG. 14 shows example blocks of process 1400, in some aspects, process 1400 may include additional blocks, fewer blocks, different blocks, or differently arranged blocks than those depicted in FIG. 14. Additionally or alternatively, two or more of the blocks of process 1400 may be performed in parallel.

Figure 15:
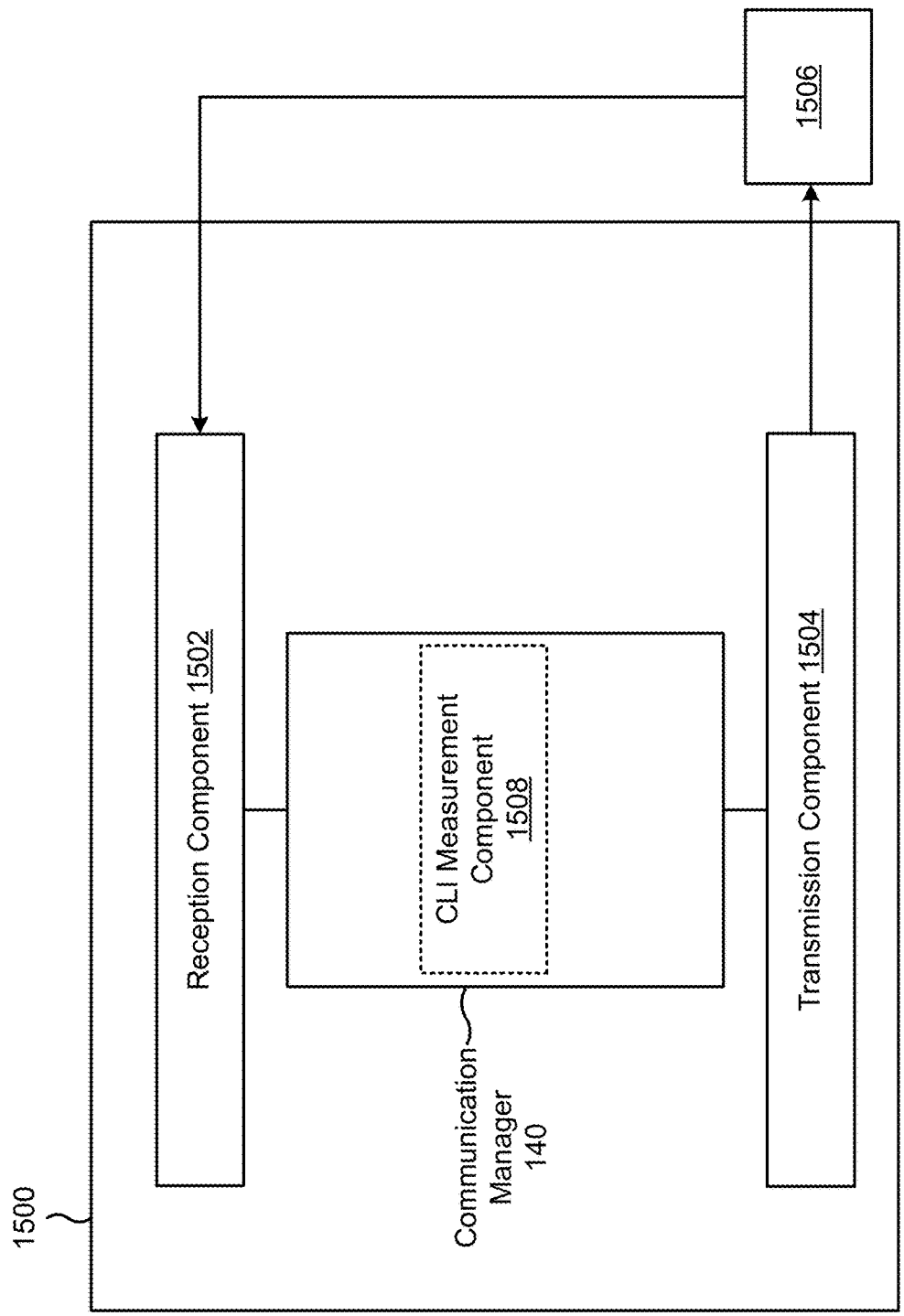
FIGS. 15-16 are diagrams of example apparatuses for wireless communication that support event-triggered L1 or L2 CLI reporting in accordance with the present disclosure.

FIG. 15 is a diagram of an example apparatus 1500 for wireless communication that supports event-triggered L1 or L2 CLI reporting in accordance with the present disclosure. The apparatus 1500 may be a UE, or a UE may include the apparatus 1500. In some aspects, the apparatus 1500 includes a reception component 1502, a transmission component 1504, and a communication manager 140, which may be in communication with one another (for example, via one or more buses). As shown, the apparatus 1500 may communicate with another apparatus 1506 (such as a UE, a network node, or another wireless communication device) using the reception component 1502 and the transmission component 1504.

In some aspects, the apparatus 1500 may be configured to and/or operable to perform one or more operations described herein in connection with FIGS. 8A-8B, 9, and 10. Additionally or alternatively, the apparatus 1500 may be configured to and/or operable to perform one or more processes described herein, such as process 1100 of FIG. 11. In some aspects, the apparatus 1500 may include one or more components of the UE described above in connection with FIG. 2.

The reception component 1502 may receive communications, such as reference signals, control information, and/or data communications, from the apparatus 1506. The reception component 1502 may provide received communications to one or more other components of the apparatus 1500, such as the communication manager 140. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, and/or a memory of the UE described above in connection with FIG. 2.

The transmission component 1504 may transmit communications, such as reference signals, control information, and/or data communications, to the apparatus 1506. In some aspects, the communication manager 140 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, and/or a memory of the UE described above in connection with FIG. 2. In some aspects, the transmission component 1504 may be co-located with the reception component 1502 in a transceiver.

The communication manager 140 may perform a UE-to-UE CLI measurement. The communication manager 140 may transmit or may cause the transmission component 1504 to transmit an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a CLI measurement component 1508. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The CLI measurement component 1508 may perform a UE-to-UE CLI measurement. The transmission component 1504 may transmit an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

The reception component 1502 may receive configuration information indicating the CLI threshold associated with the Li trigger event.

The reception component 1502 may receive an information element associated with event-triggered L1 CLI reporting, the information element including configuration information indicating the one or more periodic uplink resources.

The reception component 1502 may receive an information element including configuration information indicating a CLI resource on which the CLI measurement is to be performed, wherein performing the UE-to-UE CLI measurement comprises performing the UE-to-UE CLI measurement on the CLI resource.

The reception component 1502 may receive an information element including configuration information indicating one or more event identifiers associated with one or more Li trigger events, each associated with at least one respective CLI threshold, wherein the one or more L1 trigger events include the L1 trigger event, and wherein the condition associated with the L1 trigger event is satisfied in connection with the UE-to-UE CLI measurement satisfying the at least one respective CLI threshold associated with the L1 trigger event.

The reception component 1502 may receive an information element including configuration information indicating a physical priority index for the L1 CLI report.

The transmission component 1504 may transmit a scheduling request including an indication that the condition associated with the L1 trigger event is satisfied.

The reception component 1502 may receive an uplink grant in connection with the scheduling request, wherein the L1 CLI report is transmitted in association with receiving the uplink grant.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
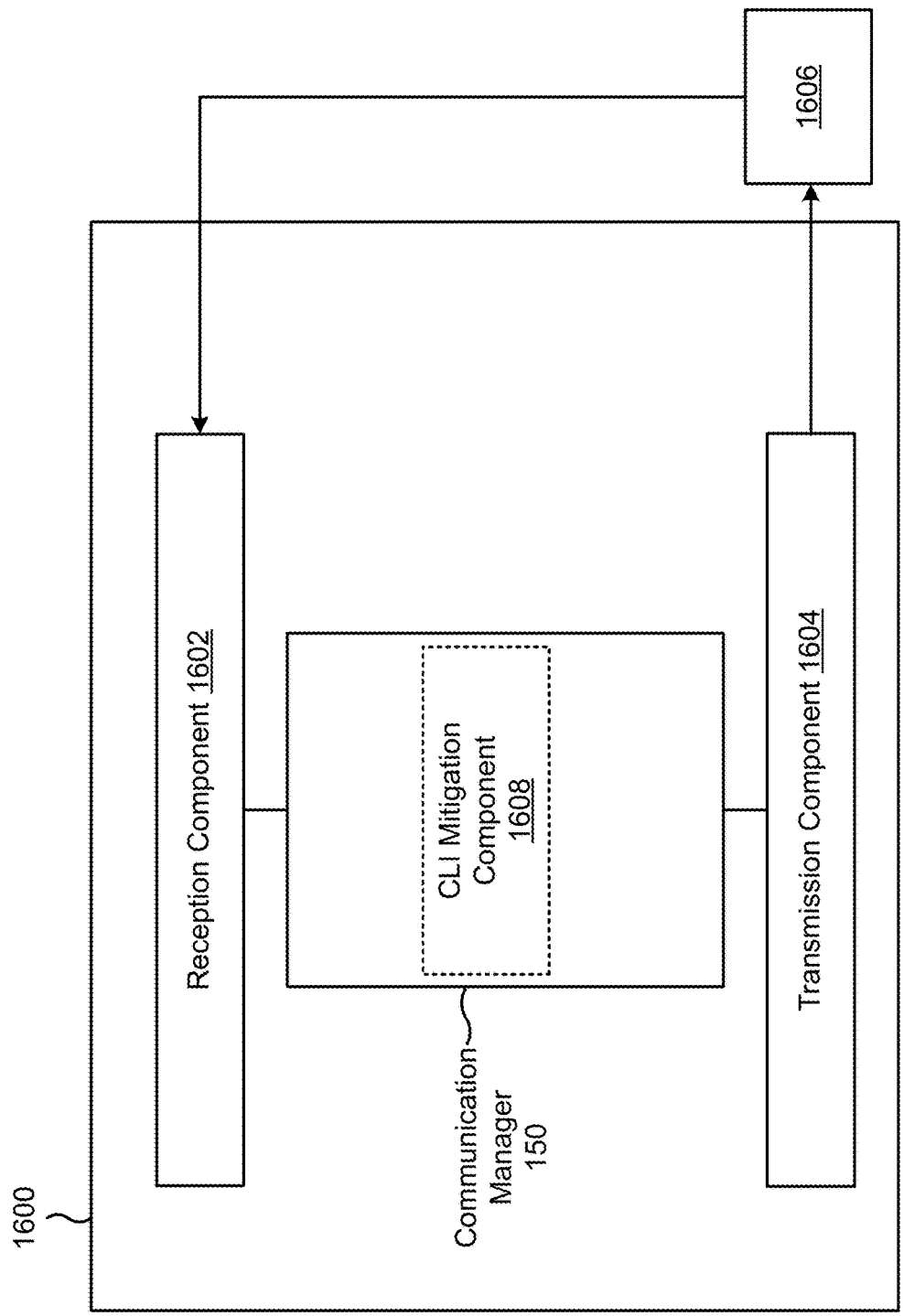

FIG. 16 is a diagram of an example apparatus 1600 for wireless communication that supports event-triggered L1 or L2 CLI reporting in accordance with the present disclosure. The apparatus 1600 may be a network node, or a network node may include the apparatus 1600. In some aspects, the apparatus 1600 includes a reception component 1602, a transmission component 1604, and a communication manager 150, which may be in communication with one another (for example, via one or more buses). As shown, the apparatus 1600 may communicate with another apparatus 1606 (such as a UE, a network node, or another wireless communication device) using the reception component 1602 and the transmission component 1604.

In some aspects, the apparatus 1600 may be configured to and/or operable to perform one or more operations described herein in connection with FIGS. 8A-8B, 9, and 10. Additionally or alternatively, the apparatus 1600 may be configured to and/or operable to perform one or more processes described herein, such as process 1200 of FIG. 12. In some aspects, the apparatus 1600 may include one or more components of the network node described above in connection with FIG. 2.

The reception component 1602 may receive communications, such as reference signals, control information, and/or data communications, from the apparatus 1606. The reception component 1602 may provide received communications to one or more other components of the apparatus 1600, such as the communication manager 150. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a modem, a demodulator, a MIMO detector, a receive processor, a controller/processor, and/or a memory of the network node described above in connection with FIG. 2.

The transmission component 1604 may transmit communications, such as reference signals, control information, and/or data communications, to the apparatus 1606. In some aspects, the communication manager 150 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, and/or a memory of the network node described above in connection with FIG. 2. In some aspects, the transmission component 1604 may be co-located with the reception component 1602 in a transceiver.

The communication manager 150 may transmit or may cause the transmission component 1604 to transmit, to a UE, an indication of a CLI resource associated with a UE-to-UE CLI measurement to be performed by the UE. The communication manager 150 may receive or may cause the reception component 1602 to receive, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a CLI mitigation component 1608. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1604 may transmit, to a UE, an indication of a CLI resource associated with a UE-to-UE CLI measurement to be performed by the UE. The reception component 1602 may receive, from the UE, an L1 CLI report associated with the UE-to-UE CLI measurement or an L2 CLI report associated with the UE-to-UE CLI measurement in connection with a condition associated with an L1 trigger event or a condition associated with an L2 trigger event being satisfied, respectively.

The transmission component 1604 may transmit configuration information indicating the CLI threshold associated with the L1 trigger event.

The transmission component 1604 may transmit an information element associated with event-triggered L1 CLI reporting, the information element including configuration information indicating the one or more periodic uplink resources.

The transmission component 1604 may transmit an information element including configuration information indicating the indication of the CLI resource.

The transmission component 1604 may transmit an information element including configuration information indicating one or more event identifiers associated with one or more L1 trigger events, each associated with at least one respective CLI threshold, wherein the one or more L1 trigger events include the L1 trigger event, and wherein the condition associated with the Li trigger event is satisfied in connection with the UE-to-UE CLI measurement satisfying the at least one respective CLI threshold associated with the L1 trigger event.

The transmission component 1604 may transmit an information element including configuration information indicating a physical priority index for the L1 CLI report.

The reception component 1602 may receive a scheduling request including an indication that the condition associated with the L1 trigger event is satisfied.

The transmission component 1604 may transmit an uplink grant in connection with the scheduling request, wherein the L1 CLI report is received in connection with transmitting the uplink grant.

The CLI mitigation component 1608 may perform CLI mitigation associated with the L1 CLI report or the L2 CLI report.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
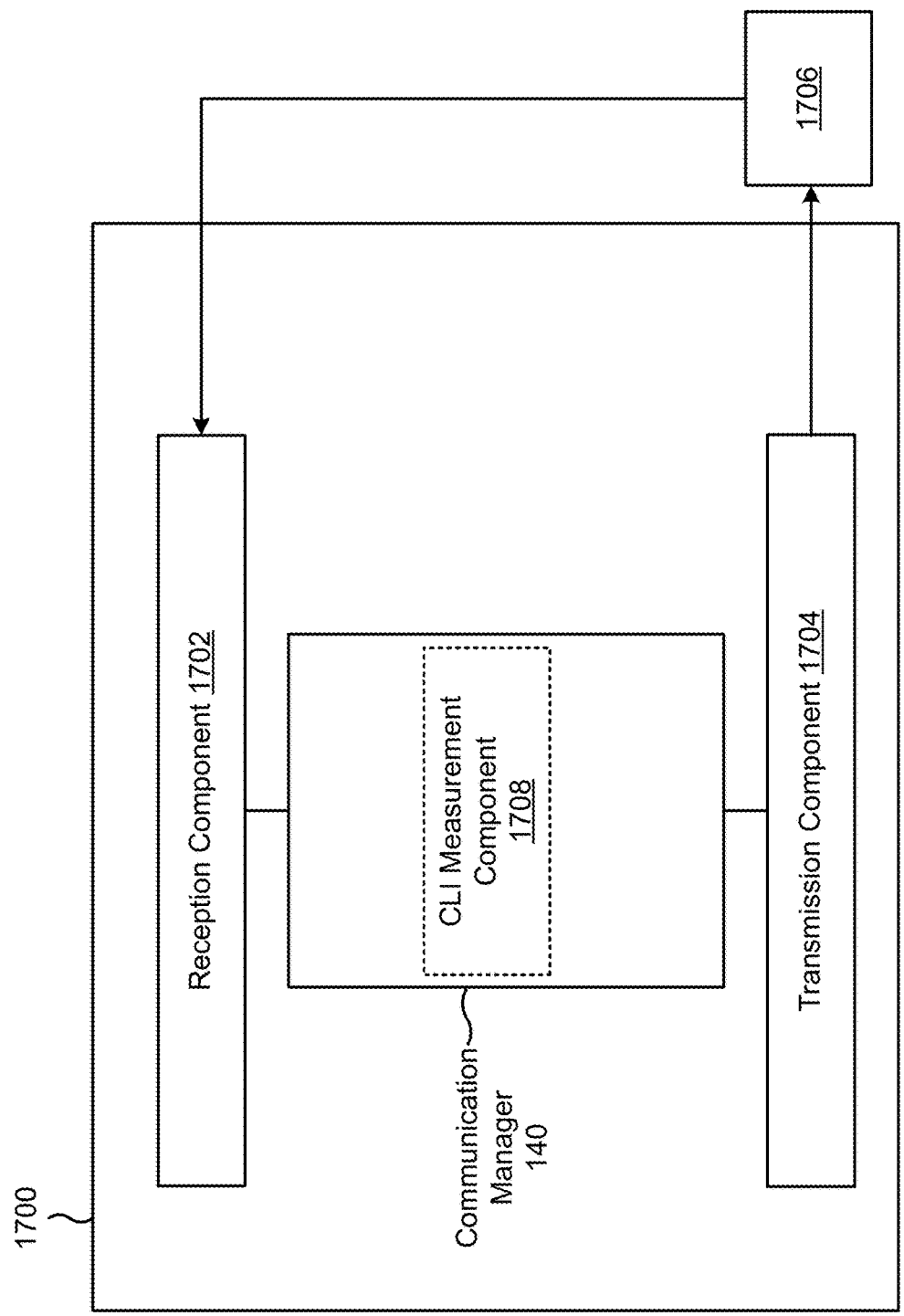
FIGS. 17-18 are diagrams of an example apparatuses for wireless communication that support CLI reporting with assistance information in accordance with the present disclosure.

FIG. 17 is a diagram of an example apparatus 1700 for wireless communication that supports CLI reporting with assistance information in accordance with the present disclosure. The apparatus 1700 may be a UE, or a UE may include the apparatus 1700. In some aspects, the apparatus 1700 includes a reception component 1702, a transmission component 1704, and a communication manager 140, which may be in communication with one another (for example, via one or more buses). As shown, the apparatus 1700 may communicate with another apparatus 1706 (such as a UE, a network node, or another wireless communication device) using the reception component 1702 and the transmission component 1704.

In some aspects, the apparatus 1700 may be configured to and/or operable to perform one or more operations described herein in connection with FIGS. 8A-8B, 9, and 10. Additionally or alternatively, the apparatus 1700 may be configured to and/or operable to perform one or more processes described herein, such as process 1300 of FIG. 13. In some aspects, the apparatus 1700 may include one or more components of the UE described above in connection with FIG. 2.

The reception component 1702 may receive communications, such as reference signals, control information, and/or data communications, from the apparatus 1706. The reception component 1702 may provide received communications to one or more other components of the apparatus 1700, such as the communication manager 140. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1702 may include one or more antennas, a modem, a demodulator, a MIMO detector, a receive processor, a controller/processor, and/or a memory of the UE described above in connection with FIG. 2.

The transmission component 1704 may transmit communications, such as reference signals, control information, and/or data communications, to the apparatus 1706. In some aspects, the communication manager 140 may generate communications and may transmit the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, and/or a memory of the UE described above in connection with FIG. 2. In some aspects, the transmission component 1704 may be co-located with the reception component 1702 in a transceiver.

The communication manager 140 may perform a UE-to-UE CLI measurement. The communication manager 140 may transmit or may cause the transmission component 1704 to transmit a CLI report indicating the UE-to-UE CLI measurement and assistance information associated with the UE-to-UE CLI measurement. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a CLI measurement component 1708. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The CLI measurement component 1708 may perform a UE-to-UE CLI measurement. The transmission component 1704 may transmit a CLI report indicating the UE-to-UE CLI measurement and assistance information associated with the UE-to-UE CLI measurement.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

Figure 18:
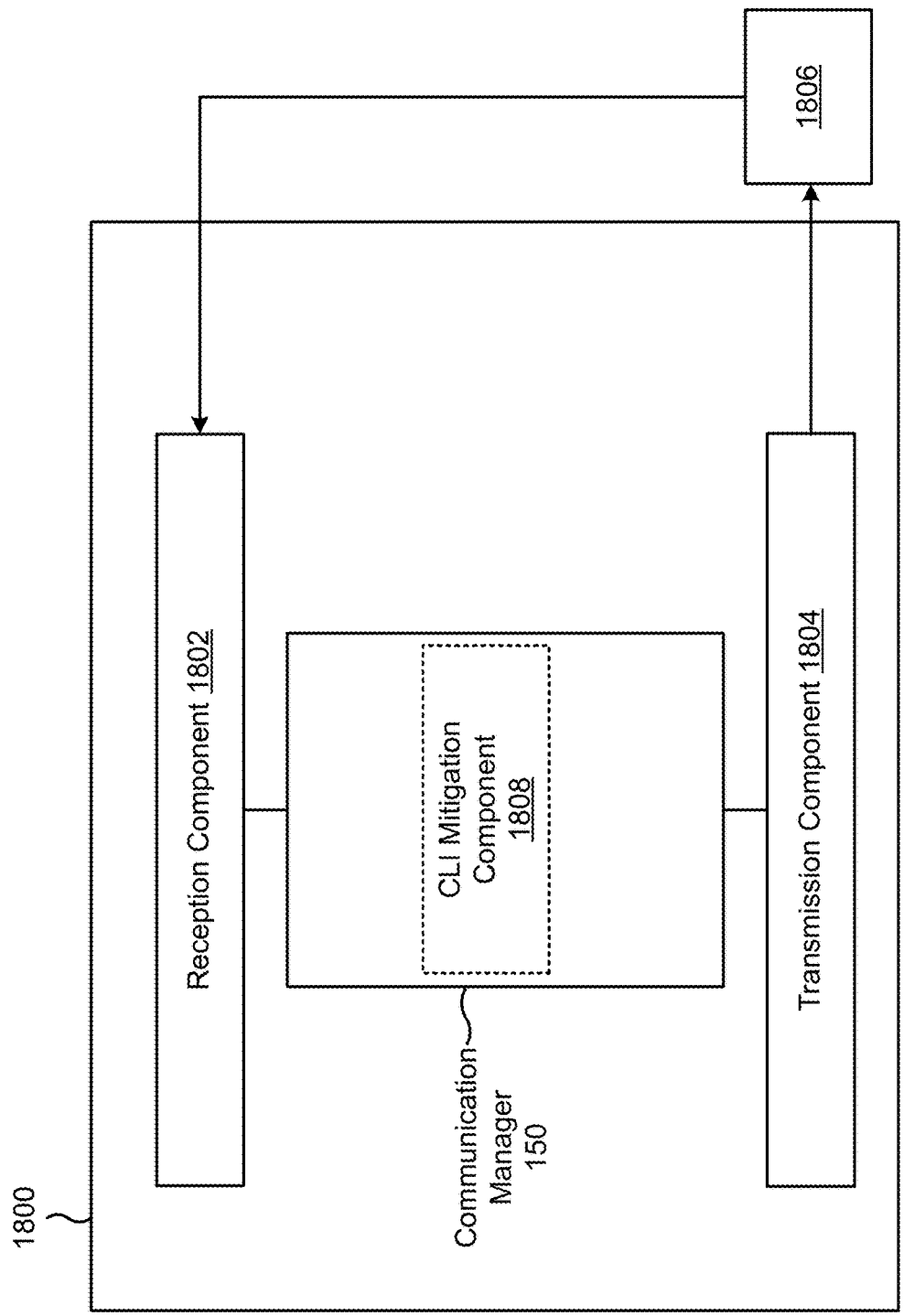

FIG. 18 is a diagram of an example apparatus 1800 for wireless communication that supports CLI reporting with assistance information in accordance with the present disclosure. The apparatus 1800 may be a network node, or a network node may include the apparatus 1800. In some aspects, the apparatus 1800 includes a reception component 1802, a transmission component 1804, and a communication manager 150, which may be in communication with one another (for example, via one or more buses). As shown, the apparatus 1800 may communicate with another apparatus 1806 (such as a UE, a network node, or another wireless communication device) using the reception component 1802 and the transmission component 1804.

In some aspects, the apparatus 1800 may be configured to and/or operable to perform one or more operations described herein in connection with FIGS. 8A-8B, 9, and 10. Additionally or alternatively, the apparatus 1800 may be configured to and/or operable to perform one or more processes described herein, such as process 1400 of FIG. 14. In some aspects, the apparatus 1800 may include one or more components of the network node described above in connection with FIG. 2.

The reception component 1802 may receive communications, such as reference signals, control information, and/or data communications, from the apparatus 1806. The reception component 1802 may provide received communications to one or more other components of the apparatus 1800, such as the communication manager 150. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1802 may include one or more antennas, a modem, a demodulator, a MIMO detector, a receive processor, a controller/processor, and/or a memory of the network node described above in connection with FIG. 2.

The transmission component 1804 may transmit communications, such as reference signals, control information, and/or data communications, to the apparatus 1806. In some aspects, the communication manager 150 may generate communications and may transmit the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, and/or a memory of the network node described above in connection with FIG. 2. In some aspects, the transmission component 1804 may be co-located with the reception component 1802 in a transceiver.

The communication manager 150 may transmit or may cause the transmission component 1804 to transmit, to a UE, an indication of a CLI resource associated with a UE-to-UE CLI measurement to be performed by the UE. The communication manager 150 may receive or may cause the reception component 1802 to receive, from the UE, a CLI report indicating the UE-to-UE CLI measurement and assistance information associated with the UE-to-UE CLI measurement. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a CLI mitigation component 1808. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1804 may transmit, to a UE, an indication of a CLI resource associated with a UE-to-UE CLI measurement to be performed by the UE. The reception component 1802 may receive, from the UE, a CLI report indicating the UE-to-UE CLI measurement and assistance information associated with the UE-to-UE CLI measurement.

The CLI mitigation component 1808 may perform CLI mitigation associated with the CLI report.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: performing a UE-to-UE cross link interference (CLI) measurement; and transmitting a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

Aspect 2: The method of Aspect 1, wherein transmitting the L1 CLI report associated with the UE-to-UE CLI measurement or the L2 CLI report associated with the UE-to-UE CLI measurement comprises: transmitting the L1 CLI report associated with the UE-to-UE CLI measurement in connection with the condition associated with the Li trigger event being satisfied.

Aspect 3: The method of any of Aspects 1-2, wherein the condition associated with the L1 trigger event is satisfied in connection with the UE-to-UE CLI measurement satisfying a CLI threshold associated with the L1 trigger event.

Aspect 4: The method of Aspect 3, wherein performing the UE-to-UE CLI measurement comprises measuring at least one of a CLI reference signal received power (RSRP) value, a CLI received signal strength indicator (RSSI) value, or a CLI signal-to-interference plus noise ratio (SINR) value, and wherein the UE-to-UE CLI measurement satisfies the CLI threshold in connection with at least one of the CLI RSRP value satisfying a CLI RSRP threshold, the CLI RSSI value satisfying a CLI RSSI threshold, or the CLI SINR value satisfying a CLI SINR threshold.

Aspect 5: The method of any of Aspects 3-4, further comprising: receiving configuration information indicating the CLI threshold associated with the L1 trigger event.

Aspect 6: The method of Aspect 5, wherein the configuration information indicates a plurality of CLI thresholds associated with respective Li trigger events, the plurality of CLI thresholds including the CLI threshold associated with the L1 trigger event.

Aspect 7: The method of any of Aspects 1-6, wherein transmitting the Li CLI report associated with the UE-to-UE CLI measurement comprises: transmitting the L1 CLI report on one or more periodic uplink resources reserved for L1 CLI reporting in connection with the L1 trigger event.

Aspect 8: The method of Aspect 7, further comprising: receiving an information element associated with event-triggered L1 CLI reporting, the information element including configuration information indicating the one or more periodic uplink resources.

Aspect 9: The method of any of Aspects 7-8, wherein the one or more periodic uplink resources include one or more periodic physical uplink control channel (PUCCH) resources or one or more periodic physical uplink shared channel (PUSCH) resources.

Aspect 10: The method of any of Aspects 1-9, further comprising: receiving an information element including configuration information indicating a CLI resource on which the CLI measurement is to be performed, wherein performing the UE-to-UE CLI measurement comprises performing the UE-to-UE CLI measurement on the CLI resource.

Aspect 11: The method of Aspect 10, wherein the configuration information indicates a periodicity and an offset for the CLI resource.

Aspect 12: The method of any of Aspects 1-11, further comprising: receiving an information element including configuration information indicating one or more event identifiers associated with one or more L1 trigger events, each associated with at least one respective CLI threshold, wherein the one or more L1 trigger events include the L1 trigger event, and wherein the condition associated with the Li trigger event is satisfied in connection with the UE-to-UE CLI measurement satisfying the at least one respective CLI threshold associated with the L1 trigger event.

Aspect 13: The method of Aspect 12, wherein the at least one respective CLI threshold associated with each Li trigger event, of the one or more L1 trigger events, is identified in another information element.

Aspect 14: The method of Aspect 12, wherein the configuration information further indicates the at least one CLI threshold associated with each L1 trigger event, of the one or more L1 trigger events.

Aspect 15: The method of any of Aspects 1-14, further comprising: receiving an information element including configuration information indicating a physical priority index for the L1 CLI report.

Aspect 16: The method of any of Aspects 1-15, wherein the condition associated with the L1 trigger event is satisfied in connection with the UE-to-UE CLI measurement satisfying a CLI threshold associated with the L1 trigger event, and wherein the L1 CLI report includes an indication that the UE-to-UE CLI measurement satisfies the CLI threshold.

Aspect 17: The method of any of Aspects 1-16, wherein the L1 CLI report includes an indication of one or more CLI metrics associated with the UE-to-UE CLI measurement.

Aspect 18: The method of any of Aspects 1-17, further comprising: transmitting a scheduling request including an indication that the condition associated with the L1 trigger event is satisfied; and receiving an uplink grant in connection with the scheduling request, wherein the L1 CLI report is transmitted in association with receiving the uplink grant.

Aspect 19: The method of Aspect 18, wherein the scheduling request is associated with a scheduling request identifier associated with event triggered L1 CLI reporting.

Aspect 20: The method of any of Aspects 1-19, wherein transmitting the L1 CLI report associated with the UE-to-UE CLI measurement comprises: transmitting the L1 CLI report in a scheduling request.

Aspect 21: The method of any of Aspects 1-20, wherein transmitting the L1 CLI report associated with the UE-to-UE CLI measurement comprises: transmitting the L1 CLI report in a random access channel (RACH) resource.

Aspect 22: The method of Aspect 21, wherein the RACH resource is a RACH occasion (RO) associated with contention free random access (CFRA).

Aspect 23: The method of any of Aspects 21-22, wherein the L1 CLI report includes an indication that the condition associated with the L1 trigger event is satisfied.

Aspect 24: The method of any of Aspects 21-23, wherein the L1 CLI report includes an indication of one or more CLI metrics associated with the UE-to-UE CLI measurement.

Aspect 25: The method of Aspect 24, wherein the one or more CLI metrics include one or more of a CLI reference signal received power (RSRP), a CLI received signal strength indicator (RSSI), or a CLI signal-to-interference plus noise ratio (SINR).

Aspect 26: The method of any of Aspects 1-25, wherein transmitting the L1 CLI report associated with the UE-to-UE CLI measurement or the L2 CLI report associated with the UE-to-UE CLI measurement comprises: transmitting the L2 CLI report associated with the UE-to-UE CLI measurement in connection with the condition associated with the L2 trigger event being satisfied.

Aspect 27: The method of any of Aspects 1-26, wherein the condition associated with the L2 trigger event is satisfied in connection with the UE-to-UE CLI measurement satisfying a CLI threshold associated with the L2 trigger event.

Aspect 28: The method of Aspect 27, wherein the L2 trigger event is one of multiple L2 trigger events, each associated with a respective CLI threshold.

Aspect 29: The method of any of Aspects 1-28, wherein transmitting the L2 CLI report associated with the UE-to-UE CLI measurement comprises: transmitting the L2 CLI report in an uplink medium access control (MAC) control element (MAC-CE) associated with L2 CLI reporting in connection with the L2 trigger event.

Aspect 30: The method of any of Aspects 1-29, wherein transmitting the L2 CLI report associated with the UE-to-UE CLI measurement comprises: transmitting multiple medium access control (MAC) control elements (MAC-CEs), each including a respective L2 CLI report associated with at least one respective UE-to-UE CLI measurement, in connection with the condition associated with the L2 trigger event being satisfied.

Aspect 31: The method of any of Aspects 1-30, wherein the L1 CLI report or the L2 CLI report includes assistance information associated with the UE-to-UE CLI measurement.

Aspect 32: The method of Aspect 31, wherein the assistance information indicates at least one of a delta timing associated with the UE-to-UE CLI measurement or a power backoff for an aggressor UE associated with the UE-to-UE CLI measurement.

Aspect 33: The method of any of Aspects 1-32, wherein performing the UE-to-UE CLI measurement comprises: performing the UE-to-UE CLI measurement in at least one of a downlink sub-band or an uplink sub-band of a sub-band full duplex (SBFD) slot or symbol.

Aspect 34: The method of any of Aspects 1-33, wherein performing the UE-to-UE CLI measurement comprises: performing the UE-to-UE CLI measurement in a downlink dynamic time division duplex (TDD) slot or symbol, a partial overlapping in-band full duplex slot or symbol, or a fully overlapping in-band full duplex slot or symbol.

Aspect 35: A method of wireless communication performed by a network node, comprising: transmitting, to a user equipment (UE), an indication of a cross link interference (CLI) resource associated with a UE-to-UE CLI measurement to be performed by the UE; and receiving, from the UE, a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

Aspect 36: The method of Aspect 35, wherein receiving the Li CLI report associated with the UE-to-UE CLI measurement or the L2 CLI report associated with the UE-to-UE CLI measurement comprises: receiving the Li CLI report associated with the UE-to-UE CLI measurement in connection with the condition associated with the Li trigger event being satisfied.

Aspect 37: The method of any of Aspects 35-36, wherein the condition associated with the L1 trigger event is satisfied in connection with the UE-to-UE CLI measurement satisfying a CLI threshold associated with the L1 trigger event.

Aspect 38: The method of Aspect 37, wherein the UE-to-UE CLI measurement includes at least one of a CLI reference signal received power (RSRP) value, a CLI received signal strength indicator (RSSI) value, or a CLI signal-to-interference plus noise ratio (SINR) value, and wherein the UE-to-UE CLI measurement satisfies the CLI threshold in connection with at least one of the CLI RSRP value satisfying a CLI RSRP threshold, the CLI RSSI value satisfying a CLI RSSI threshold, or the CLI SINR value satisfying a CLI SINR threshold.

Aspect 39: The method of any of Aspects 37-38, further comprising: transmitting configuration information indicating the CLI threshold associated with the L1 trigger event.

Aspect 40: The method of Aspect 39, wherein the configuration information indicates a plurality of CLI thresholds associated with respective L1 trigger events, the plurality of CLI thresholds including the CLI threshold associated with the L1 trigger event.

Aspect 41: The method of any of Aspects 35-40, wherein receiving the L1 CLI report associated with the UE-to-UE CLI measurement comprises: receiving the Li CLI report on one or more periodic uplink resources reserved for L1 CLI reporting in connection with the L1 trigger event.

Aspect 42: The method of Aspect 41, further comprising: transmitting an information element associated with event-triggered L1 CLI reporting, the information element including configuration information indicating the one or more periodic uplink resources.

Aspect 43: The method of any of Aspects 41-42, wherein the one or more periodic uplink resources include one or more periodic physical uplink control channel (PUCCH) resources or one or more periodic physical uplink shared channel (PUSCH) resources.

Aspect 44: The method of any of Aspects 35-43, further comprising: transmitting an information element including configuration information indicating the indication of the CLI resource.

Aspect 45: The method of Aspect 44, wherein the configuration information indicates a periodicity and an offset for the CLI resource.

Aspect 46: The method of any of Aspects 35-45, further comprising: transmitting an information element including configuration information indicating one or more event identifiers associated with one or more L1 trigger events, each associated with at least one respective CLI threshold, wherein the one or more L1 trigger events include the L1 trigger event, and wherein the condition associated with the Li trigger event is satisfied in connection with the UE-to-UE CLI measurement satisfying the at least one respective CLI threshold associated with the L1 trigger event.

Aspect 47: The method of Aspect 46, wherein the at least one respective CLI threshold associated with each Li trigger event, of the one or more L1 trigger events, is identified in another information element transmitted by the network node.

Aspect 48: The method of Aspect 46, wherein the configuration information further indicates the at least one CLI threshold associated with each L1 trigger event, of the one or more L1 trigger events.

Aspect 49: The method of any of Aspects 35-48, further comprising: transmitting an information element including configuration information indicating a physical priority index for the L1 CLI report.

Aspect 50: The method of any of Aspects 35-49, wherein the condition associated with the L1 trigger event is satisfied in connection with the UE-to-UE CLI measurement satisfying a CLI threshold associated with the L1 trigger event, and wherein the L1 CLI report includes an indication that the UE-to-UE CLI measurement satisfies the CLI threshold.

Aspect 51: The method of any of Aspects 35-50, wherein the Li CLI report includes an indication of one or more CLI metrics associated with the UE-to-UE CLI measurement.

Aspect 52: The method of any of Aspects 35-51, further comprising: receiving a scheduling request including an indication that the condition associated with the L1 trigger event is satisfied; and transmitting an uplink grant in connection with the scheduling request, wherein the L1 CLI report is received in connection with transmitting the uplink grant.

Aspect 53: The method of Aspect 52, wherein the scheduling request is associated with a scheduling request identifier associated with event triggered L1 CLI reporting.

Aspect 54: The method of any of Aspects 35-53, wherein receiving the L1 CLI report associated with the UE-to-UE CLI measurement comprises: receiving the Li CLI report in a scheduling request.

Aspect 55: The method of any of Aspects 35-54, wherein receiving the L1 CLI report associated with the UE-to-UE CLI measurement comprises: receiving the Li CLI report in a random access channel (RACH) resource.

Aspect 56: The method of Aspect 55, wherein the RACH resource is a RACH occasion (RO) associated with contention free random access (CFRA).

Aspect 57: The method of any of Aspects 55-56, wherein the L1 CLI report includes an indication that the condition associated with the Li trigger event is satisfied.

Aspect 58: The method of any of Aspects 55-57, wherein the L1 CLI report includes an indication of one or more CLI metrics associated with the UE-to-UE CLI measurement.

Aspect 59: The method of Aspect 58, wherein the one or more CLI metrics include one or more of a CLI reference signal received power (RSRP), a CLI received signal strength indicator (RSSI), or a CLI signal-to-interference plus noise ratio (SINR).

Aspect 60: The method of any of Aspects 35-59, wherein receiving the L1 CLI report associated with the UE-to-UE CLI measurement or the L2 CLI report associated with the UE-to-UE CLI measurement comprises: receiving the L2 CLI report associated with the UE-to-UE CLI measurement in connection with the condition associated with the L2 trigger event being satisfied.

Aspect 61: The method of any of Aspects 35-60, wherein the condition associated with the L2 trigger event is satisfied in connection with the UE-to-UE CLI measurement satisfying a CLI threshold associated with the L2 trigger event.

Aspect 62: The method of Aspect 61, wherein the L2 trigger event is one of multiple L2 trigger events, each associated with a respective CLI threshold.

Aspect 63: The method of any of Aspects 35-62, wherein receiving the L2 CLI report associated with the UE-to-UE CLI measurement comprises: receiving the L2 CLI report in an uplink medium access control (MAC) control element (MAC-CE) associated with L2 CLI reporting in connection with the L2 trigger event.

Aspect 64: The method of any of Aspects 35-63, wherein receiving the L2 CLI report associated with the UE-to-UE CLI measurement comprises: receiving multiple medium access control (MAC) control elements (MAC-CEs), each including a respective L2 CLI report associated with at least one respective UE-to-UE CLI measurement, in connection with the condition associated with the L2 trigger event being satisfied.

Aspect 65: The method of any of Aspects 35-64, wherein the Li CLI report or the L2 CLI report includes assistance information associated with the UE-to-UE CLI measurement.

Aspect 66: The method of Aspect 65, wherein the assistance information indicates at least one of a delta timing associated with the UE-to-UE CLI measurement or a power backoff for an aggressor UE associated with the UE-to-UE CLI measurement.

Aspect 67: The method of any of Aspects 35-66, wherein the CLI resource is in at least one of: a downlink sub-band of a sub-band full duplex (SBFD) slot or symbol, an uplink sub-band of an SBFD slot or symbol, a downlink dynamic time division duplex (TDD) slot or symbol, a partial overlapping in-band full duplex slot or symbol, or a fully overlapping in-band full duplex slot or symbol.

Aspect 68: A method of wireless communication performed by a user equipment (UE), comprising: performing a UE-to-UE cross link interference (CLI) measurement; and transmitting a CLI report indicating the UE-to-UE CLI measurement and assistance information associated with the UE-to-UE CLI measurement.

Aspect 69: The method of Aspect 68, wherein the assistance information indicates at least one of a delta timing associated with the UE-to-UE CLI measurement or a power backoff for an aggressor UE associated with the UE-to-UE CLI measurement.

Aspect 70: The method of any of Aspects 68-69, wherein the CLI report is an event triggered CLI report.

Aspect 71: The method of any of Aspects 68-70, wherein the CLI report is a layer 1 (L1) CLI report, a layer 2 (L2) CLI report, or a layer 3 (L3) CLI report.

Aspect 72: The method of any of Aspects 68-71, wherein the CLI report is a periodic CLI report, a semi-persistent CLI report, or an aperiodic CLI report.

Aspect 73: A method of wireless communication performed by a network node, comprising: transmitting, to a user equipment (UE), an indication of a cross link interference (CLI) resource associated with a UE-to-UE CLI measurement to be performed by the UE; and receiving, from the UE, a CLI report indicating the UE-to-UE CLI measurement and assistance information associated with the UE-to-UE CLI measurement.

Aspect 74: The method of Aspect 73, wherein the assistance information indicates at least one of a delta timing associated with the UE-to-UE CLI measurement or a power backoff for an aggressor UE associated with the UE-to-UE CLI measurement.

Aspect 75: The method of any of Aspects 73-74, wherein the CLI report is an event triggered CLI report.

Aspect 76: The method of any of Aspects 73-75, wherein the CLI report is a layer 1 (L1) CLI report, a layer 2 (L2) CLI report, or a layer 3 (L3) CLI report.

Aspect 77: The method of any of Aspects 73-76, wherein the CLI report is a periodic CLI report, a semi-persistent CLI report, or an aperiodic CLI report.

Aspect 78: An apparatus for wireless communication at a device, comprising a processor; memory coupled with the processor; and instructions stored in the memory and executable by the processor to cause the apparatus to perform the method of one or more of Aspects 1-77.

Aspect 79: A device for wireless communication, comprising a memory and one or more processors coupled to the memory, the one or more processors configured to perform the method of one or more of Aspects 1-77.

Aspect 80: An apparatus for wireless communication, comprising at least one means for performing the method of one or more of Aspects 1-77.

Aspect 81: A non-transitory computer-readable medium storing code for wireless communication, the code comprising instructions executable by a processor to perform the method of one or more of Aspects 1-77.

Aspect 82: A non-transitory computer-readable medium storing a set of instructions for wireless communication, the set of instructions comprising one or more instructions that, when executed by one or more processors of a device, cause the device to perform the method of one or more of Aspects 1-77.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
one or more memories storing processor-readable code; and
one or more processors coupled with the one or more memories and individually or collectively operable to cause the UE to:
perform a UE-to-UE cross link interference (CLI) measurement; and
transmit a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

2. The UE of claim 1, wherein the one or more processors are further individually or collectively operable to cause the UE to:
receive configuration information indicating a CLI threshold associated with the L1 trigger event, wherein the condition associated with the L1 trigger event is satisfied in connection with the UE-to-UE CLI measurement satisfying the CLI threshold associated with the L1 trigger event.

3. The UE of claim 2, wherein, to cause the UE to perform the UE-to-UE CLI measurement, the one or more processors are individually or collectively operable to cause the UE to measure at least one of a CLI reference signal received power (RSRP) value, a CLI received signal strength indicator (RSSI) value, or a CLI signal-to-interference plus noise ratio (SINR) value, and wherein the UE-to-UE CLI measurement satisfies the CLI threshold in connection with at least one of the CLI RSRP value satisfying a CLI RSRP threshold, the CLI RSSI value satisfying a CLI RSSI threshold, or the CLI SINR value satisfying a CLI SINR threshold.

4. The UE of claim 2, wherein the configuration information indicates a plurality of CLI thresholds associated with respective L1 trigger events, the plurality of CLI thresholds including the CLI threshold associated with the L1 trigger event.

5. The UE of claim 1, wherein, to cause the UE to transmit the L1 CLI report associated with the UE-to-UE CLI measurement, the one or more processors are individually or collectively operable to cause the UE to:
transmit the L1 CLI report on one or more periodic uplink resources reserved for L1 CLI reporting in connection with the L1 trigger event.

6. The UE of claim 5, wherein the one or more processors are further individually or collectively operable to cause the UE to:
receive an information element associated with event-triggered L1 CLI reporting, the information element including configuration information indicating the one or more periodic uplink resources.

7. The UE of claim 1, wherein the one or more processors are further individually or collectively operable to cause the UE to:
receive an information element including configuration information indicating a CLI resource on which the CLI measurement is to be performed, wherein to cause the UE to perform the UE-to-UE CLI measurement, the one or more processors are further individually or collectively operable to cause the UE to perform the UE-to-UE CLI measurement on the CLI resource.

8. The UE of claim 7, wherein the configuration information indicates a periodicity and an offset for the CLI resource.

9. The UE of claim 1, wherein the one or more processors are further individually or collectively operable to cause the UE to:
receive an information element including configuration information indicating one or more event identifiers associated with one or more L1 trigger events, each associated with at least one respective CLI threshold, wherein the one or more L1 trigger events include the L1 trigger event, and wherein the condition associated with the L1 trigger event is satisfied in connection with the UE-to-UE CLI measurement satisfying the at least one respective CLI threshold associated with the L1 trigger event.

10. The UE of claim 9, wherein the configuration information further indicates the at least one respective CLI threshold associated with each L1 trigger event, of the one or more L1 trigger events, or wherein the at least one CLI threshold associated with each L1 trigger event, of the one or more L1 trigger events, is identified in another information element.

11. The UE of claim 1, wherein the one or more processors are further individually or collectively operable to cause the UE to:
receive an information element including configuration information indicating a physical priority index for the L1 CLI report.

12. The UE of claim 1, wherein the condition associated with the L1 trigger event is satisfied in connection with the UE-to-UE CLI measurement satisfying a CLI threshold associated with the L1 trigger event, and wherein the L1 CLI report includes at least one of an indication that the UE-to-UE CLI measurement satisfies the CLI threshold or an indication of one or more CLI metrics associated with the UE-to-UE CLI measurement.

13. The UE of claim 1, wherein the one or more processors are further individually or collectively operable to cause the UE to:
transmit a scheduling request including an indication that the condition associated with the L1 trigger event is satisfied, wherein the scheduling request is associated with a scheduling request identifier associated with event triggered L1 CLI reporting; and
receive an uplink grant in connection with the scheduling request, wherein the L1 LI report is transmitted in association with receiving the uplink grant.

14. The UE of claim 1, wherein, to cause the UE to transmit the L1 CLI report associated with the UE-to-UE CLI measurement, the one or more processors are individually or collectively operable to cause the UE to:

transmit the L1 CLI report in a random access channel (RACH) resource, wherein the L1 CLI report includes at least one of an indication that the condition associated with the L1 trigger event is satisfied or an indication of one or more CLI metrics associated with the UE-to-UE CLI measurement.

15. The UE of claim 1, wherein the condition associated with the L2 trigger event is satisfied in connection with the UE-to-UE CLI measurement satisfying a CLI threshold associated with the L2 trigger event.

16. The UE of claim 1, wherein, to cause the UE to transmit the L2 CLI report associated with the UE-to-UE CLI measurement, the one or more processors are individually or collectively operable to cause the UE to:
transmit the L2 CLI report in an uplink medium access control (MAC) control element (MAC-CE) associated with L2 CLI reporting in connection with the L2 trigger event.

17. The UE of claim 1, wherein, to cause the UE to transmit the L2 CLI report associated with the UE-to-UE CLI measurement, the one or more processors are individually or collectively operable to cause the UE to:
transmit multiple medium access control (MAC) control elements (MAC-CEs), each including a respective L2 CLI report associated with at least one respective UE-to-UE CLI measurement, in connection with the condition associated with the L2 trigger event being satisfied.

18. The UE of claim 1, wherein the L1 CLI report or the L2 CLI report includes assistance information associated with the UE-to-UE CLI measurement, and wherein the assistance information indicates at least one of a delta timing associated with the UE-to-UE CLI measurement or a power backoff for an aggressor UE associated with the UE-to-UE CLI measurement.

19. The UE of claim 1, wherein, to cause the UE to perform the UE-to-UE CLI measurement, the one or more processors are individually or collectively operable to cause the UE to perform the UE-to-UE CLI measurement in at least one of:
a downlink sub-band of a sub-band full duplex (SBFD) slot or symbol,
an uplink sub-band of an SBFD slot or symbol,
a downlink dynamic time division duplex (TDD) slot or symbol,
a partial overlapping in-band full duplex slot or symbol, or a
fully overlapping in-band full duplex slot or symbol.

20. A network node for wireless communication, comprising:
one or more memories storing processor-readable code; and
one or more processors coupled with the one or more memories and individually or collectively operable to cause the network node to:
transmit, to a user equipment (UE), an indication of a cross link interference (CLI) resource associated with a UE-to-UE CLI measurement to be performed by the UE; and
receive, from the UE, a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

21. The network node of claim 20, wherein the one or more processors are further individually or collectively operable to cause the network node to:
transmit configuration information indicating a CLI threshold associated with the L1 trigger event, wherein the condition associated with the L1 trigger event is satisfied in connection with the UE-to-UE CLI measurement satisfying the CLI threshold associated with the L1 trigger event.

22. The network node of claim 20, wherein, to cause the network node to receive the L1 CLI report associated with the UE-to-UE CLI measurement, the one or more processors are individually or collectively operable to cause the network node to:
receive the L1 CLI report on one or more periodic uplink resources reserved for L1 CLI reporting in connection with the L1 trigger event.

23. The network node of claim 22, wherein the one or more processors are further individually or collectively operable to cause the network node to:
transmit an information element associated with event-triggered L1 CLI reporting, the information element including configuration information indicating the one or more periodic uplink resources.

24. The network node of claim 20, wherein the condition associated with the L1 trigger event is satisfied in connection with the UE-to-UE CLI measurement satisfying a CLI threshold associated with the L1 trigger event, and wherein the L1 CLI report includes at least one of an indication that the UE-to-UE CLI measurement satisfies the CLI threshold or an indication of one or more CLI metrics associated with the UE-to-UE CLI measurement.

25. The network node of claim 20, wherein the one or more processors are further individually or collectively operable to cause the network node to:
receive a scheduling request including an indication that the condition associated with the L1 trigger event is satisfied, wherein the scheduling request is associated with a scheduling request identifier associated with event triggered L1 CLI reporting; and
transmit an uplink grant in connection with the scheduling request, wherein the L1 CLI report is received in association with transmitting the uplink grant.

26. The network node of claim 20, wherein, to cause the network node to receive the L1 CLI report associated with the UE-to-UE CLI measurement, the one or more processors are individually or collectively operable to cause the network node to:
receive the L1 CLI report in a random access channel (RACH) resource, wherein the L1 CLI report includes at least one of an indication that the condition associated with the L1 trigger event is satisfied or an indication of one or more CLI metrics associated with the UE-to-UE CLI measurement.

27. The network node of claim 20, wherein the condition associated with the L2 trigger event is satisfied in connection with the UE-to-UE CLI measurement satisfying a CLI threshold associated with the L2 trigger event, and wherein, to cause the network node to receive the L2 CLI report associated with the UE-to-UE CLI measurement, the one or more processors are individually or collectively operable to cause the network node to:
receive the L2 CLI report in an uplink medium access control (MAC) control element (MAC-CE) associated with L2 CLI reporting in connection with the L2 trigger event.

28. The network node of claim 20, wherein, to cause the network node to receive the L2 CLI report associated with the UE-to-UE CLI measurement, the one or more processors are individually or collectively operable to cause the network node to:

receive multiple medium access control (MAC) control elements (MAC-CEs), each including a respective L2 CLI report associated with at least one respective UE-to-UE CLI measurement, in connection with the condition associated with the L2 trigger event being satisfied.

29. A method of wireless communication performed by a user equipment (UE), comprising:

performing a UE-to-UE cross link interference (CLI) measurement; and transmitting a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

30. A method of wireless communication performed by a network node, comprising:

transmitting, to a user equipment (UE), an indication of a cross link interference (CLI) resource associated with a UE-to-UE CLI measurement to be performed by the UE; and receiving, from the UE, a layer 1 (L1) CLI report associated with the UE-to-UE CLI measurement or a layer 2 (L2) CLI report associated with the UE-to-UE CLI measurement in connection with a condition associated with an L1 trigger event or a condition associated with an L2 trigger event being satisfied, respectively.

* * * * *